United States Patent
Lee et al.

(10) Patent No.: US 10,482,320 B2
(45) Date of Patent: Nov. 19, 2019

(54) DEVICE AND METHOD FOR PROVIDING MOVING BODY INFORMATION FOR A VEHICLE, AND RECORDING MEDIUM, ON WHICH A PROGRAM FOR EXECUTING THE METHOD IS RECORDED

(71) Applicants: LG INNOTEK CO., LTD., Seoul (KR); IUCF-HYU (INDUSTRY-UNIVERSITY COOPERATION FOUNDATION HANYANG UNIVERSITY), Seoul (KR)

(72) Inventors: Jung Hun Lee, Seoul (KR); Min Kyu Kim, Seoul (KR); Jae Kyu Suhr, Incheon (KR); Sung Hyun Lim, Seoul (KR); Ho Gi Jung, Seoul (KR)

(73) Assignees: LG INNOTEK CO., LTD., Seoul (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 32 days.

(21) Appl. No.: 15/742,693

(22) PCT Filed: Jul. 7, 2016

(86) PCT No.: PCT/KR2016/007353
§ 371 (c)(1),
(2) Date: Jan. 8, 2018

(87) PCT Pub. No.: WO2017/007251
PCT Pub. Date: Jan. 12, 2017

(65) Prior Publication Data
US 2018/0211105 A1 Jul. 26, 2018

(30) Foreign Application Priority Data

Jul. 8, 2015 (KR) .................. 10-2015-0097384

(51) Int. Cl.
| | | |
|---|---|---|
| *G06K 9/00* | (2006.01) | |
| *G08G 1/16* | (2006.01) | |
| *G06T 7/246* | (2017.01) | |

(52) U.S. Cl.
CPC ..... *G06K 9/00369* (2013.01); *G06K 9/00805* (2013.01); *G06T 7/251* (2017.01); *G08G 1/16* (2013.01); *G08G 1/166* (2013.01)

(58) Field of Classification Search
CPC .......... G06K 9/00369; G06K 9/00805; G06K 9/4671; G06K 9/6269; G06K 9/6274;
(Continued)

(56) References Cited

U.S. PATENT DOCUMENTS

| 2003/0083790 A1 | 5/2003 | Hattori et al. |
| 2004/0057600 A1 | 3/2004 | Niwa |
(Continued)

FOREIGN PATENT DOCUMENTS

| JP | 6-223157 A | 8/1994 |
| JP | 7-223487 A | 8/1995 |
(Continued)

*Primary Examiner* — Jose L Couso
(74) *Attorney, Agent, or Firm* — Birch, Stewart, Kolasch & Birch, LLP

(57) ABSTRACT

A device for providing moving body information for a vehicle, according to one embodiment, includes an image acquisition unit acquiring a peripheral image of the vehicle, an image extraction unit extracting at least one of a first image of an upper body of at least one moving object or a second image of a lower body of the moving object from the peripheral image of the vehicle, and a moving object information determination unit determining at least one of presence/absence or a position of the moving object using at
(Continued)

least one of the extracted first image or second image, wherein the image extraction unit extracts as the first image at least one of a '1-1'-st image of an entirety of the upper body or a '1-2'-nd image of a part of the upper body, and extracts as the second image at least one of a '2-1'-st image of an entirety of the lower body or a '2-2'-nd image of a part of the lower body.

20 Claims, 14 Drawing Sheets

(58) Field of Classification Search
CPC ............ G06K 9/6282; G06K 9/00651; G06K 9/00791; G06K 9/00798; G06K 9/00812; G06K 9/00825; G06K 9/4604; G06K 9/4642; G06K 9/6201; G06K 9/6212; G06K 9/6215; G06K 2209/21; G06K 2209/23; H04N 7/181; H04N 7/188; G06T 7/251; G06T 7/254; G06T 7/215; G06T 2207/30248; G06T 2207/30252; G06T 2207/30261; G06T 2207/30264; G08G 1/16; G08G 1/166; G08G 1/00; G08G 1/164; G08G 1/167; G08G 1/168; G08G 1/165; G08B 21/0476; B60R 25/305; B60R 1/00; B60R 1/002; B60R 21/0134; B60R 2021/0004; B60R 2021/0006; B60R 2300/101; B60R 2300/102; B60R 2300/105; B60R 2300/107; B60R 2300/303; B60R 2300/802; B60R 2300/804; B60R 2300/806; B60R 2300/8086; B60R 2300/8093; B60W 50/14; B60W 50/00; B60W 30/00; B60W 30/08; B60W 30/09; B60W 30/095; B60W 30/16; B60W 40/00; B60W 40/04; B60W 40/06; G05D 1/0246; G05D 1/0251; G05D 1/0253; B60Q 9/008; B60Q 1/525; B60T 7/22; B60T 2201/022; B60T 2210/34
See application file for complete search history.

(56) References Cited

U.S. PATENT DOCUMENTS

| | | | | |
|---|---|---|---|---|
| 2004/0183906 | A1* | 9/2004 | Nagaoka | B60R 1/00 348/148 |
| 2006/0115115 | A1* | 6/2006 | Nagaoka | G06K 9/00362 382/103 |
| 2007/0211919 | A1* | 9/2007 | Nagaoka | G06K 9/00369 382/104 |
| 2007/0248245 | A1* | 10/2007 | Aimura | G06K 9/00362 382/104 |
| 2009/0041302 | A1* | 2/2009 | Nagaoka | G06K 9/00369 382/103 |
| 2010/0094174 | A1 | 4/2010 | Choi et al. | |
| 2011/0032358 | A1* | 2/2011 | Nagaoka | G08G 1/166 348/148 |
| 2012/0327236 | A1* | 12/2012 | Kiyohara | G06K 9/00369 348/148 |
| 2014/0270378 | A1* | 9/2014 | Aimura | G06K 9/00805 382/103 |

FOREIGN PATENT DOCUMENTS

| | | |
|---|---|---|
| JP | 2003-134508 A | 5/2003 |
| KR | 10-2008-0020441 A | 3/2008 |
| KR | 10-2008-0083803 A | 9/2008 |
| KR | 10-2013-0138481 A | 12/2013 |
| KR | 10-2015-0050783 A | 5/2015 |

* cited by examiner

DEVICE AND METHOD FOR PROVIDING MOVING BODY INFORMATION FOR A VEHICLE, AND RECORDING MEDIUM, ON WHICH A PROGRAM FOR EXECUTING THE METHOD IS RECORDED

CROSS REFERENCE TO RELATED APPLICATIONS

This application is the National Phase of PCT International Application No. PCT/KR2016/007353, filed on Jul. 7, 2016, which claims priority under 35 U.S.C. 119(a) to Patent Application No. 10-2015-0097384, filed in the Republic of Korea on Jul. 8, 2015, all of which are hereby expressly incorporated by reference into the present application.

TECHNICAL FIELD

Embodiments relate to a device and method for providing moving object information for a vehicle, and a recording medium on which a program for executing the method is recorded.

BACKGROUND ART

Traffic accidents related to a person, particularly a child, present in the vicinity of a vehicle due to a backward movement of a vehicle, have recently become common. In order to prevent such traffic accidents, mounting the camera on the back of the vehicle is becoming mandatory in several countries. This is because installing a rear-view camera on a vehicle can reduce traffic accidents by up to 25%, for example. In particular, when a rear-view camera is installed, a blind spot behind the vehicle can be reduced compared to a case where a rear ultrasonic sensor is installed on the back of the vehicle. According to a study conducted by the US Highway Safety Insurance Association in 2014, about 6% of drivers having a rear ultrasonic sensor on their vehicle can avoid collisions, while about 44% of drivers having a rear-view camera on their vehicle can avoid collisions.

Conventional rear-view cameras mounted on a vehicle cannot correctly figure out the presence or position of a person located in the vicinity of the vehicle due to various postures of a person located in the vicinity of the vehicle, hide of a part of the body, or distortion of a fisheye lens. That is, information on a person located in the vicinity of the vehicle may not be accurately detected due to various circumstances regarding whether a person around the vehicle is standing or seated, whether the person's upper body is hidden or the person's lower body is hidden.

Although the method of part-based pedestrian detection is adopted in order to cope with various environments around the vehicle as described above, this method results in a large amount of calculation in detecting a person.

DISCLOSURE

Technical Problem

Embodiments provide a moving object information providing device and method for a vehicle which are capable of correctly providing information on a moving object located in the vicinity of a vehicle with a small amount of calculation, and a recording medium on which a program for executing the method is recorded.

Technical Solution

In an embodiment, a moving object information providing device for a vehicle may include an image acquisition unit configured to acquire a peripheral image of the vehicle, an image extraction unit configured to extract at least one of a first image of an upper body of at least one moving object or a second image of a lower body of the moving object from the peripheral image of the vehicle, and a moving object information determination unit configured to determine at least one of presence/absence of the moving object around the vehicle or a position of the moving object using at least one of the extracted first image or second image.

For example, the image extraction unit may extract, as the first image, at least one of a '1-1'-st image of an entirety of the upper body of the moving object or a '1-2'-nd image of a part of the upper body of the moving object, and extract, as the second image, at least one of a '2-1'-st image of an entirety of the lower body of the moving object, or a '2-2'-nd image of a part of the lower body of the moving object.

For example, the image extraction unit may include at least one '1-1'-st image detection unit configured to detect the '1-1'-st image from the acquired peripheral image, and at least one '2-1'-st image detection unit configured to detect the '2-1'-st image from the acquired peripheral image.

For example, the image extraction unit may include at least one of at least one '1-1'-st image verification unit configured to verify the '1-1'-st image detected by the '1-1'-st image detection unit, or at least one '2-1'-st image verification unit configured to verify the '2-1'-st image detected by the '2-1'-st image detection unit.

For example, the image extraction unit further may include at least one first 1-2 image detection unit configured to detect the '1-2'-nd image from the '1-1'-st image detected by the '1-1'-st image detection unit or verified by the '1-1'-st image verification unit, and at least one '2-2'-nd image detection unit configured to detect the '2-2'-nd image from the '2-1'-st image detected by the '2-1'-st image detection unit or verified by the '2-1'-st image verification unit.

For example, the image extraction unit may include at least one of at least one '1-2'-nd image verification unit configured to verify the '1-2'-nd image detected by the '1-2'-nd image detection unit, or at least one '2-2'-nd image verification unit configured to verify the '2-2'-nd image detected by the '2-2'-nd image detection unit.

For example, the image extraction unit may extract at least one of the first or second image from the acquired peripheral image according to the direction in which the moving object faces with respect to the vehicle.

For example, the at least one '1-1'-st image detection unit may include a '1-1-1'-st image detection unit configured to detect the '1-1'-st image in a first direction in which the moving object faces the vehicle from the acquired peripheral image, and a '1-1-2'-nd image detection unit configured to detect the '1-1'-st image in a second direction different from the first direction from the acquired peripheral image, wherein the at least one '2-1'-st image detection unit may include a '2-1-1'-st image detection unit configured to detect the '2-1'-st image in the first direction from the acquired peripheral image, and a '2-1-2'-nd image detection unit configured to detect the '2-1'-st image in the second direction from the acquired peripheral image.

For example, the '1-1'-st image detection unit may include a first common image detection unit configured to detect the '1-1'-st image from the acquired peripheral image, and a first image classification unit configured to classify the '1-1'-st image according to a direction in which the moving object faces with respect to the vehicle from the '1-1'-st image detected by the first common image detection unit, wherein the '2-1'-st image detection unit may include a second common image detection unit configured to detect the '2-1'-st image from the acquired peripheral image, and a second image classification unit configured to classify the '2-1'-st image according to a direction in which the moving object faces with respect to the vehicle from the '2-1'-st image detected by the second common image detection unit.

For example, the at least one '1-1'-st image verification unit may include at least one of a '1-1-1'-st image verification unit configured to verify the '1-1'-st image in the first direction detected by the '1-1-1'-st image detection unit or classified by the first image classification unit, or a '1-1-2'-nd image verification unit configured to verify the '1-1'-st image in the second direction detected by the '1-1-2'-nd image detection unit or classified by the first image classification unit, wherein the at least one '2-1'-st image verification unit may include at least one a '2-1-1'-st image verification unit configured to verify the '2-1'-st image in the first direction detected by the '2-1-1'-st image detection unit or classified by the second image classification unit, or a '2-1-2'-nd image verification unit configured to verify the '2-1'-st image in the second direction detected by the '2-1-2'-nd image detection unit or classified by the second image classification unit.

For example, the at least one '1-2'-nd image detection unit may include a '1-2-1'-st image detection unit configured to detect the '1-2'-nd image in the first direction from the '1-1'-st image detected by the '1-1-1'-st image detection unit, classified by the first image classification unit or verified by the '1-1-1'-st image verification unit, and a '1-2-2'-nd image detection unit configured to detect the '1-2'-nd image in the second direction from the '1-2'-nd image detected by the '1-1-2'-nd image detection unit, classified by the first image classification unit or verified by the '1-1-2'-nd image verification unit, wherein the at least one '2-2'-nd image detection unit further may include a '2-2-1'-st image detection unit configured to detect the '2-2'-nd image in the first direction from the '2-1'-st image detected by the '2-1-1'-st image detection unit, classified by the second image classification unit or verified by the '2-1-1'-st image verification unit, and a '2-2-2'-nd image detection unit configured to detect the '2-2'-nd image in the second direction from the '2-1'-st image detected by the '2-1-2'-nd image detection unit, classified by the second image classification unit or verified by the '2-1-2'-nd image verification unit.

For example, the at least one first 1-2 image verification unit may include at least one of a '1-2-1'-st image verification unit configured to verify the '1-2'-nd image detected by the '1-2-1'-st image detection unit, or a '1-2-2'-nd image verification unit configured to verify the '1-2'-nd image detected by the '1-2-2'-nd image detection unit, wherein the at least one '2-2'-nd image verification unit may include at least one of a '2-2-1'-st image verification unit configured to verify the '2-2'-nd image detected by the '2-2-1'-st image detection unit, or a '2-2-2'-nd image verification unit configured to verify the '2-2'-nd image detected by the '2-2-2'-nd image detection unit.

For example, the image extraction unit may include a '1-2'-nd image detection unit configured to detect the '1-2'-nd image from the acquired peripheral image, and a '2-2'-nd image detection unit configured to detect the '2-2'-nd image from the acquired peripheral image.

For example, the image extraction unit further may include at least one of a '1-2'-nd image verification unit configured to verify the '1-2'-nd image detected by the '1-2'-nd image detection unit, or a '2-2'-nd image verification unit configured to verify the '2-2'-nd image detected by the '2-2'-nd image detection unit.

For example, the image extraction unit further may include a first image determination unit configured to determine the '1-1'-st image from the '1-2'-nd image detected by the '1-2'-nd image detection unit or verified by the '1-2'-nd image verification unit, and a second image determination unit configured to determine the '2-1'-st image from the '2-2'-nd image detected by the '2-2'-nd image detection unit or verified by the '2-2'-nd image verification unit.

For example, the image extraction unit further may include a '1-1'-st image verification unit configured to verify the '1-1'-st image determined by the first image determination unit, and a '2-1'-st image verification unit configured to verify the '2-1'-st image determined by the second image determination unit.

For example, the '1-1'-st, '1-2'-nd, '2-1'-st, or '2-2'-nd image verification unit may use at least one of a position, a size, or a pattern of the moving object to verify the '1-1'-st, '1-2'-nd, '2-1'-st, or '2-2'-nd image.

For example, each of the '1-1'-st, '1-2'-nd, '2-1'-st and '2-2'-nd image verification units may include a third image verification unit configured to verify the '1-1'-st, '1-2'-nd, '2-1'-st, or '2-2'-nd image using the position and size of the moving object to identify the first, or a fourth image verification unit configured to recognize the pattern of the moving object and verify the '1-1'-st, '1-2'-nd, '2-1'-st, or '2-2'-nd image using the recognized result.

For example, each of the '1-1'-st, '1-2'-nd, '2-1'-st and '2-2'-nd image verification units may include the third and fourth image verification units, wherein the fourth image verification unit may re-verify the '1-1'-st, '1-2'-nd, '2-1'-st, or '2-2'-nd image verified by the third image verification unit.

For example, the image extraction unit may detect the first and second images from a detection area of the acquired peripheral image, wherein the detection area may be an area of points within a first distance from the vehicle.

For example, the moving object information determination unit may determine at least one of presence/absence of the moving object or a position of the moving object using an image extracted first among the first image and the second image.

For example, the moving object information providing device may further include a moving object alert unit configured to announce the presence of the moving object in response to a result determined by the moving object information determining unit, wherein the alert area may be an area of points within a second distance from the vehicle.

For example, the moving object information determination unit may include a position tracking unit configured to track the position of the moving object using at least one of the first or second image extracted by the image extraction unit, and an information generation unit configured to determine at least one of the presence/absence of the moving object or the position of the moving object using at least one of the extracted first image or second image, or the tracked position.

In another embodiment, a method for providing moving object information for a vehicle may include (a) acquiring a peripheral image of the vehicle, (b) extracting at least one of a first image of an upper body of at least one moving object or a second image of a lower body of the moving object from the acquired peripheral image, and (c) determining at least one of presence/absence of the moving object or a position of the moving object using at least one of the extracted first image or second image.

For example, the first image may include at least one of a '1-1'-st image of an entirety of the upper body of the moving object, or a '1-2'-nd image of a part of the upper body of the moving object, wherein the second image may include at least one of a '2-1'-st image of an entirety of the lower body of the moving object, or a '2-2'-nd image of a part of the lower body of the moving object.

For example, the step (b) may include detecting the '1-1'-st image from the acquired peripheral image when the acquired peripheral image includes the '1-1'-st image, detecting the '2-1'-st image from the acquired peripheral image when the acquired peripheral image includes the '2-1'-st image, verifying the detected '1-1'-st or '2-1'-st image, detecting the '1-2'-nd or '2-2'-nd image from the verified or detected '1-1'-st or '2-1'-st image, respectively, and verifying the detected '1-2'-nd or '2-2'-nd image.

For example, the detecting of the '1-1'-st image may include detecting the '1-1'-st image of the first direction from the acquired peripheral image when the moving object contained in the '1-1'-st image included in the acquired first image faces in the first direction with respect to the vehicle, and detecting the '1-1'-st image of a second direction different from the first direction from the acquired peripheral image when the moving object contained in the '2-1'-st image included in the acquired peripheral image faces in the second direction with respect to the vehicle, wherein the detecting of the '2-1'-st image may include detecting the '2-1'-st image of the first direction from the acquired peripheral image when the moving object contained in the '2-1'-st image included in the acquired second image faces in the first direction with respect to the vehicle, and detecting the '2-1'-st image of the second direction from the acquired peripheral image when the moving object contained in the '2-1'-st image included in the acquired second image faces in the second direction with respect to the vehicle.

For example, the detecting of the '1-1'-st or '2-1'-st image may include detecting the '1-1'-st image from the acquired peripheral image when the '1-1'-st image is included in the acquired peripheral image, classifying the '1-1'-st image of a first direction from the detected '1-1'-st image when the moving object contained in the detected '1-1'-st image faces in the first direction with respect to the vehicle, classifying the '1-1'-st image of a second direction different from the first direction from the detected '1-1'-st image when the moving object contained in the detected '1-1'-st image faces in the second direction with respect to the vehicle, detecting the '2-1'-st image from the acquired peripheral image when the '2-1'-st image is included in the acquired peripheral image, classifying the '2-1'-st image of the first direction from the detected '2-1'-st image when the moving object contained in the detected '2-1'-st image faces in the first direction with respect to the vehicle, and classifying the '1-1'-st image of the second direction different from the first direction from the detected '2-1'-st image when the moving object contained in the detected '2-1'-st image faces in the second direction with respect to the vehicle.

For example, the step (b) may include detecting the '1-2'-nd image from the acquired peripheral image when the acquired peripheral image includes the '1-2'-nd image, detecting the '2-2'-nd image from the acquired peripheral image when the acquired peripheral image includes the '2-2'-nd image, verifying the detected '1-2'-nd or '2-2'-nd image, determining the '1-1'-st or '2-1'-st image from the verified '1-2'-nd or '2-2'-nd image, respectively, and verifying the determined '1-1'-st or '2-1'-st image.

For example, the moving object information providing method may further include announcing at least one of presence/absence of the moving object or the position of the moving object.

For example, the step (c) may include-tracking the position of the moving object using at least one of the extracted first or second image.

For example, when the acquired peripheral image includes both the first image and the second image, only the second image may be extracted.

In another embodiment, a computer-readable recording medium on which a program for executing a moving object information providing method for a vehicle performed by a moving object information providing device for the vehicle is recorded may record a program configured to implement a function (a) of acquiring a peripheral image of the vehicle, a function (b) of extracting at least one of a first image of an upper body of a moving object or a second image of a lower body of the moving object from the acquired peripheral image, and a function (c) of determining at least one of presence of the moving object or a position of the moving object, using at least one of the extracted first or second image.

For example, in the program recorded on the computer-readable recording medium, the first image may include at least one of a '1-1'-st image of an entirety of an upper body of the moving body or a '1-2'-nd image of a part of the upper body of the moving object, and the second image may include at least one of a '2-1'-st image of an entirety of a lower body of the moving object or a '2-2'-nd image of a part of the lower body of the moving object.

For example, the function (b) implemented by the program recorded on the computer-readable recording medium may include a function of detecting the '1-1'-st image from the acquired peripheral image when the acquired peripheral image includes the '1-1'-st image, a function of detecting the '2-1'-st image from the acquired peripheral image when the acquired peripheral image includes the '2-1'-st image, a function of verifying the detected '1-1'-st or '2-1'-st image, a function of detecting the '1-2'-nd or '2-2'-nd image from the verified '1-1'-st or '2-1'-st image, respectively, and a function of verifying the detected '1-2'-nd or '2-2'-nd image.

For example, the function of detecting the '1-1'-st image, which is implemented by the program recorded on the computer-readable recording medium, may include a function of detecting the '1-1'-st image of a first direction from the acquired peripheral image when the moving object contained in the '1-1'-st image included in the acquired first image faces in the first direction with respect to the vehicle, and a function of detecting the '1-1'-st image of a second direction different from the first direction from the acquired peripheral image when the moving object contained in the '2-1'-st image included in the acquired peripheral image faces in the second direction with respect to the vehicle, wherein the function of detecting the '2-1'-st image may include a function of detecting the '2-1'-st image of the first direction from the acquired peripheral image when the moving object contained in the '2-1'-st image included in the acquired peripheral image faces in the first direction with respect to the vehicle, and a function of detecting the '2-1'-st image of the second direction from the acquired peripheral image when the moving object contained in the '2-1'-st image included in the acquired peripheral image faces in the second direction with respect to the vehicle.

For example, the function of detecting of the '1-1'-st or '2-1'-st image, which is implemented by the program recorded on the computer-readable recording medium, may include a function of detecting the '1-1'-st image from the acquired peripheral image when the '1-1'-st image is included in the acquired peripheral image, a function of classifying the '1-1'-st image of a first direction from the detected '1-1'-st image when the moving object contained in the detected '1-1'-st image faces in the first direction with respect to the vehicle, a function of classifying the '1-1'-st image of a second direction different from the first direction from the detected '1-1'-st image when the moving object contained in the detected '1-1'-st image faces in the second direction with respect to the vehicle, a function of detecting the '2-1'-st image from the acquired peripheral image when the '2-1'-st image is included in the acquired peripheral image, a function of classifying the '2-1'-st image of the first direction from the detected '2-1'-st image when the moving object contained in the detected '2-1'-st image faces in the first direction with respect to the vehicle, and a function of classifying the '2-1'-st image of the second direction from the first direction from the detected '2-1'-st image when the moving object contained in the detected '2-1'-st image faces in the second direction with respect to the vehicle.

Advantageous Effects

According to an embodiment, a moving object information providing device and method for a vehicle and a recording medium on which a program for executing the method is recorded may accurately determine and provide information on a moving object with a small amount of calculation even in a case where the moving object assumes various postures in the vicinity of the vehicle, a part of the moving object is hidden, or the fisheye lens causes distortion.

BEST MODE

Hereinafter, embodiments of the present disclosure will be described in detail with reference to the accompanying drawings in order to facilitate understanding of the present disclosure. However, the embodiments according to the present disclosure can be modified in various other forms, and the scope of the present disclosure should not be construed as being limited to the embodiments described below. The embodiments of the present disclosure are provided to enable those skilled in the art to more fully understand the present disclosure.

It is also to be understood that relational terms, such as first and second, on/upper portion/above and under/lower portion/below, are used only to distinguish between one subject or element and another subject or element without necessarily requiring or involving any physical or logical relationship or sequence between such subjects or elements.

Figure 1:
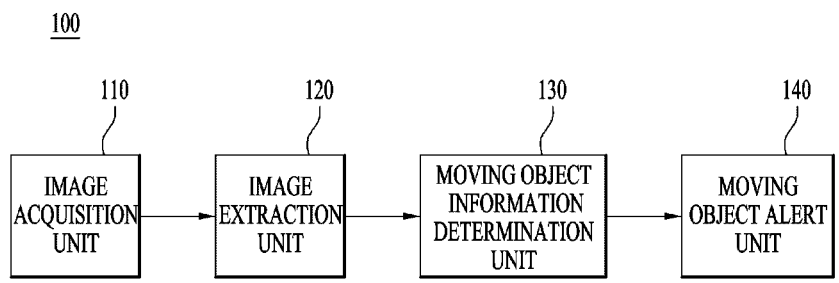
FIG. 1 is a block diagram of a moving object information providing device for a vehicle according to an embodiment.

FIG. 1 is a block diagram of a moving object information providing device 100 for a vehicle according to an embodiment and may include an image acquisition unit 110, an image extraction unit 120, a moving object information determination unit 130, and a moving object alarming unit 140.

Figure 2:
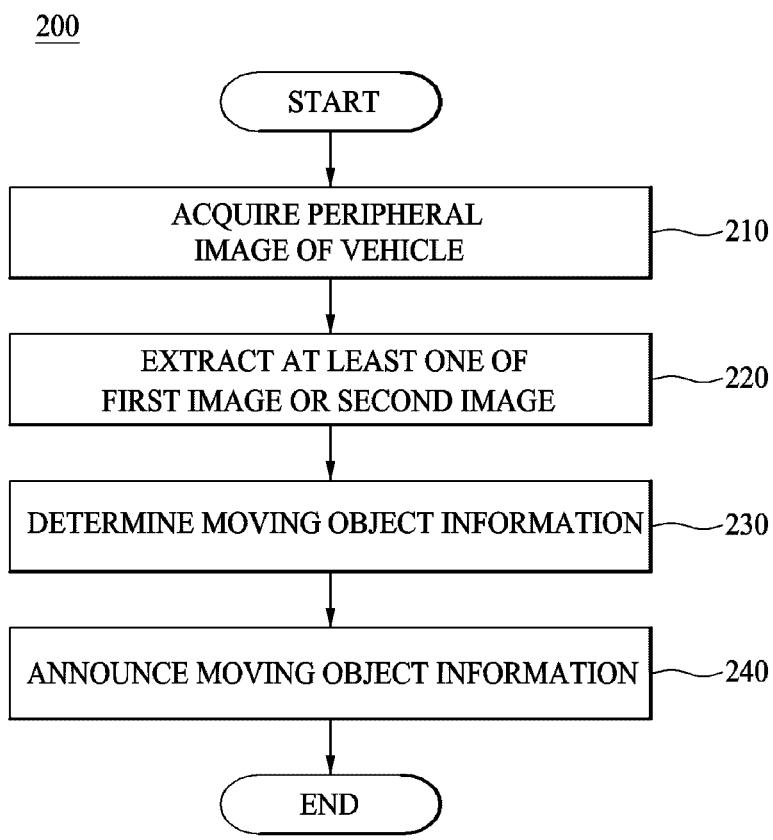
FIG. 2 is a flowchart illustrating a method for providing moving object information for a vehicle executed by the moving object information providing device for a vehicle shown in FIG. 1.

FIG. 2 is a flowchart illustrating a method 200 for providing moving object information for a vehicle executed by the moving object information providing device 100 for a vehicle shown in FIG. 1.

Hereinafter, the method 200 for providing moving object information for a vehicle illustrated in FIG. 2 is described as being executed by the device 100 shown in FIG. 1, but embodiments are not limited thereto. That is, the vehicle moving object information providing method 200 shown in FIG. 2 may be executed by another device. While the moving object information providing device 100 for a vehicle shown in FIG. 1 is described as operating in the order shown in FIG. 2, embodiments are not limited thereto. That is, according to another embodiment, the moving object information providing device 100 shown in FIG. 1 may operate in a different order from the method 200 shown in FIG. 1.

Referring to FIGS. 1 and 2, the image acquisition unit 110 of the moving object information providing device 100 according to the embodiment acquires a peripheral image of the vehicle and outputs the acquired image to the image extraction unit 120 (step 210). Here, the acquired peripheral image may correspond to an image of at least one of the front, rear, or side of the vehicle. For example, the image acquisition unit 110 may be implemented in the form of a miniature camera that may be mounted on a vehicle.

Figure 3A:
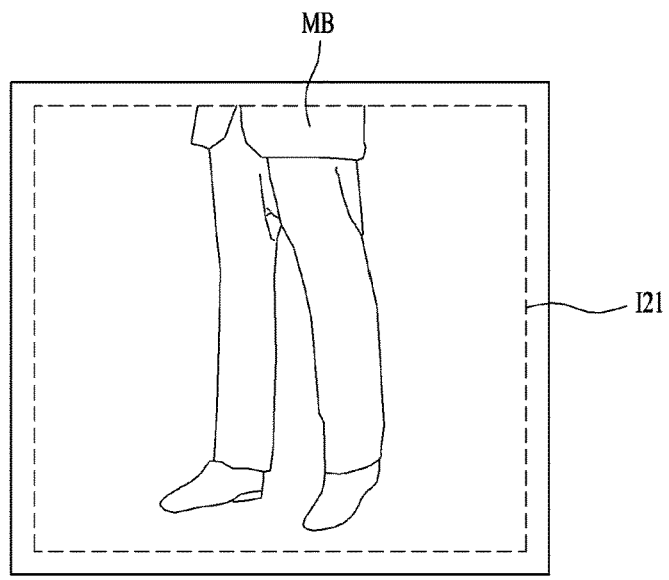
FIGS. 3A and 3B show an example of various images of surroundings for explaining a moving object information providing device and method for a vehicle according to an embodiment.
Figure 5A:
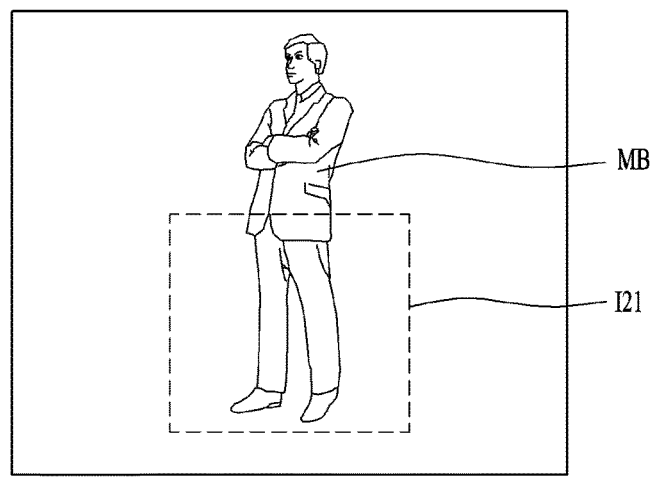
FIGS. 5A and 5B show yet another example of various images of surroundings for explaining a moving object information providing device and method for a vehicle according to an embodiment.
Figure 5B:
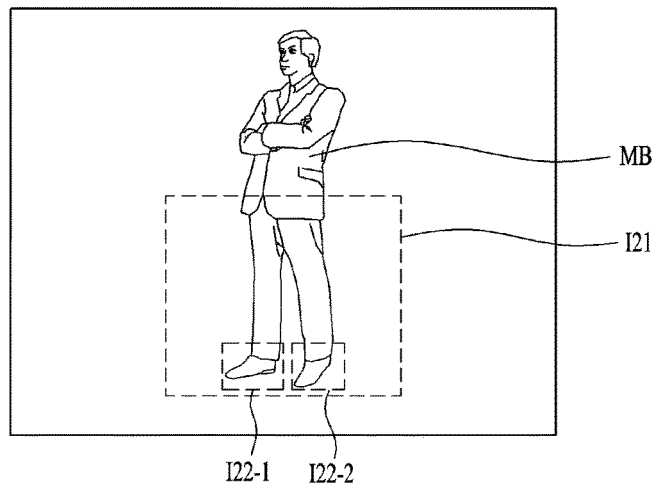

FIGS. 3A and 5B illustrate various images of surroundings for explaining the device 100 and method 200 for providing moving object information for a vehicle according to an embodiment.

After step 210, the image extraction unit 120 may extract at least one of a first image or a second image from the peripheral image of the vehicle (step 220).

Figure 3B:
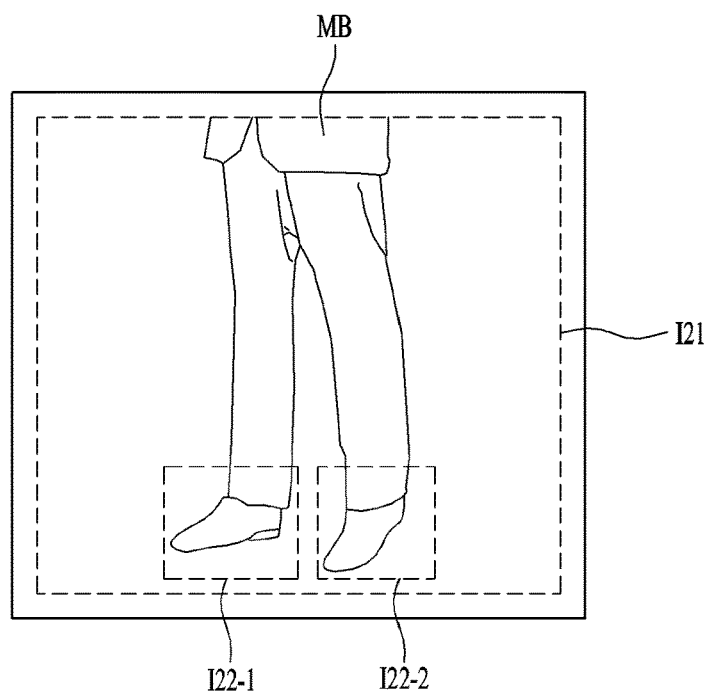
Figure 4A:
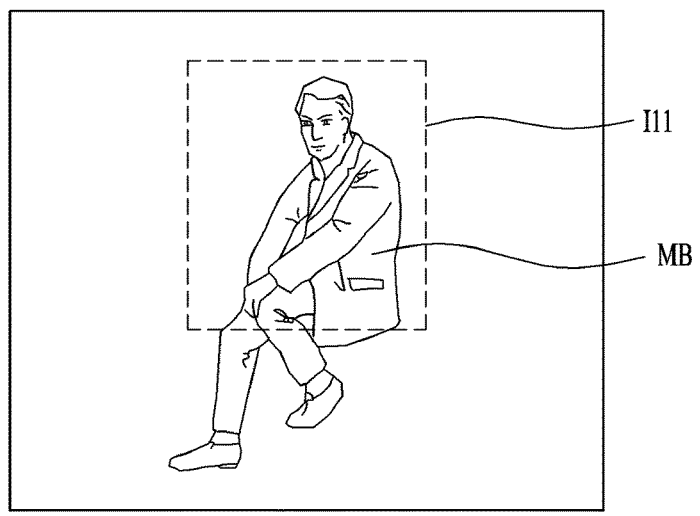
FIGS. 4A and 4B show another example of various images of surroundings for explaining a moving object information providing device and method for a vehicle according to an embodiment.
Figure 4B:
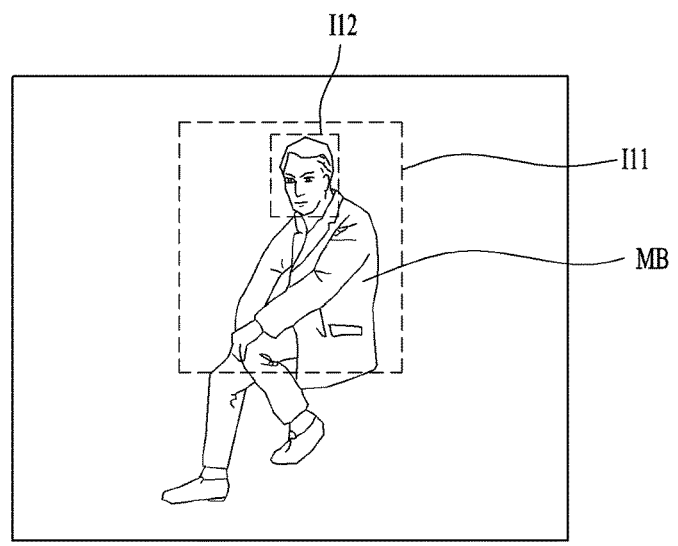

Here, the "first image" means an image of an upper body of at least one moving object, and the "second image" means an image of a lower body of the at least one moving object. For example, the first image means an image of an upper body I11 of a moving object MB assuming a squatting position as shown in FIGS. 4A and 4B, and the second image is an image of a lower body I21 of the moving object MB assuming a standing position as shown in FIGS. 3A, 3B, 5A and 5B.

The term "moving object" means an object located in the vicinity of the vehicle, which means both a stationary but movable object in the vicinity of the vehicle and an object moving around the vehicle. For example, the moving object may be a person squatting around the vehicle, a pedestrian passing around the vehicle, a person standing around the vehicle, a person riding a bike, and the like, but the embodiment is not limited to a specific type of the moving object. For example, for safety of vehicle operation, any object that the driver or occupant of the vehicle needs to know about may correspond to the moving object.

In addition, the number of moving objects contained in the peripheral image may be one or more.

The first image may include at least one of a '1-1'-st image or a '1-2'-nd image. Here, the '1-1'-st image may mean an image of the whole upper body of the moving object, and the '1-2'-nd may mean an image of a part of the upper body of the moving object. For example, when the moving object is a person, the '1-1'-st image may mean an image of the upper body of the person, and the '1-2'-nd image may mean an image of a part of the upper body of the person. For example, referring to FIGS. 4A and 4B, the '1-1'-st image I11 may be an image of an upper body of a person MB, and the '1-2'-nd image I12 may mean an image of the head of the person, which is a part of the upper body of the person. The image extraction unit 120 may extract at least one of the '1-1'-st image or the '1-2'-nd image as a first image.

A second image may include at least one of a '2-1'-st image or a '2-2'-nd image. Here, the '2-1'-st image may mean an image of the whole lower body of the moving object, and the '2-2'-nd image may mean an image of a part of the lower body of the moving object. For example, when the moving object is a person, the '2-1'-st image may mean an image of the lower body of the person, and the '2-2'-nd image may mean an image of a part of the lower body of the person. For example, referring to FIGS. 3A, 3B, 5A and 5B, the '2-1'-st image I21 may be an image of the lower body of a person MB, and the '2-2'-nd image I22-1, I22-2 may mean an image of feet, which is a part of the lower body of the person. Here, while it is illustrated that the number of the second '2-2'-nd images I22-1 and I22-2 is two, a single '2-2'-nd image or more than two '2-2'-nd images may be provided. The image extraction unit 120 may extract at least one of the '2-1'-st image or the '2-2'-nd images as the second image.

The peripheral image acquired by the image acquisition unit 110 may include at least one of the '1-1'-st, '1-2'-nd, '2-1'-st, or '2-2'-nd image. For example, the peripheral image may include only the '2-1'-st image I21 and the '2-2'-nd images I22-1 and I22-2 and may not include the '1-1'-st and '1-2'-nd images, as shown in FIGS. 3A and 3B, or may include the '1-1'-st image, the '1-2'-nd image, '2-1'-st image I21, and the '2-2'-nd image I22-1 and I22-2, as shown in FIGS. 5A and 5B.

Hereinafter, the embodiments of the image extraction unit 120 shown in FIG. 1 and step 220 shown in FIG. 2 will be described with reference to the accompanying drawings.

Figure 6:
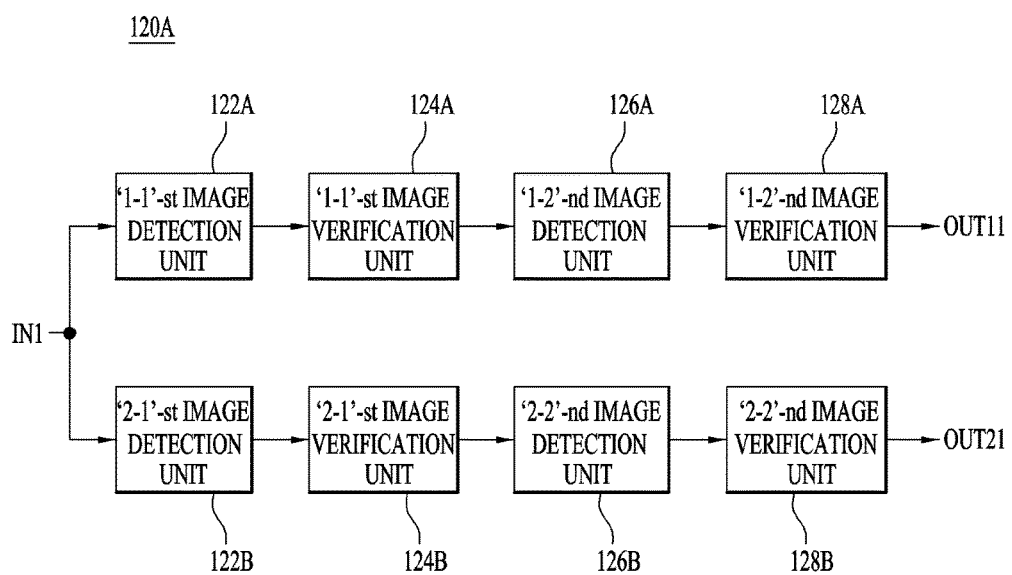
FIG. 6 is a block diagram of an embodiment of the image extraction unit shown in FIG. 1.

FIG. 6 is a block diagram of an embodiment 120A of the image extraction unit 120 shown in FIG. 1, which may include a '1-1'-st image detection unit 122A, a '1-1'-st image verification unit 124A, a '1-2'-nd image detection unit 126A, and a '1-2'-nd image verification unit 128A, a '2-1'-st image detection unit 122B, a '2-1'-st image verification unit 124B, a '2-2'-nd image detection unit 126B, and a '2-2'-nd image verification unit 128B.

Figure 7:
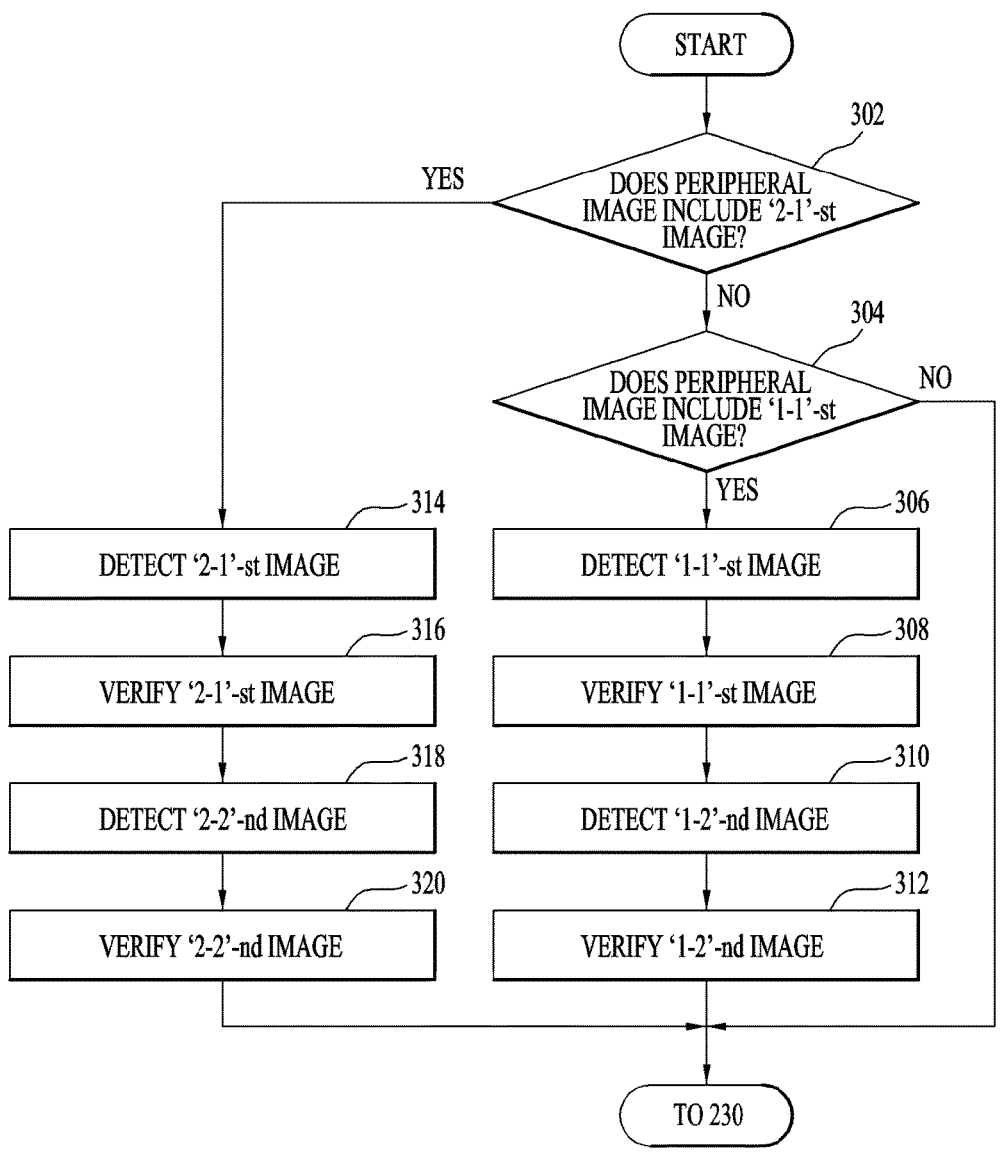
FIG. 7 is a flowchart illustrating an embodiment of step 220 of FIG. 2.

FIG. 7 is a flowchart illustrating an embodiment 220A of step 220 shown in FIG. 2.

Hereinafter, step 220A shown in FIG. 7 is described as being performed by the image extraction unit 120A shown in FIG. 6, but embodiments are not limited thereto. That is, step 220A shown in FIG. 7 may be performed by the image extraction unit 120 having a different configuration from the image extraction unit 120A shown in FIG. 6. The image extraction unit 120A shown in FIG. 6 is described as operating in the order shown in FIG. 7, but embodiments are not limited thereto. That is, according to another embodiment, the image extraction unit 120A shown in FIG. 6 may operate in a different order than in the method illustrated in FIG. 7.

First, it is determined whether an peripheral image acquired by the image acquisition unit 110 includes a '2-1'-st image (step 302). If the peripheral image includes the '2-1'-st image, the '2-1'-st image detection unit 122B may detect the '2-1'-st image from the peripheral image received from the image acquisition unit 110 through an input terminal IN1 (step 314).

Operations 302 and 314 may be performed by the '2-1'-st image detection unit 122B for the following reason. If the '2-1'-st image is included in the peripheral image, the '2-1'-st image may be detected by the '2-1'-st image detection unit 122B. If the '2-1'-st image is not included in the peripheral image, the '2-1'-st image detection unit 122B may not detect the '2-1'-st image.

If the peripheral image does not include the '2-1'-st image, it is determined whether the peripheral image includes the '1-1'-st image (step 304). If the peripheral image includes the '1-1'-st image, the '1-1'-st image detection unit 122A detects the '1-1'-st image from the peripheral image received from the image acquisition unit 110 via the input terminal IN1 (step 306).

Operations 302, 304, and 306 may be performed by the '1-1'-st image detection unit 122A for the following reason. If the '1-1'-st image is included in the peripheral image, the '1-1'-st image may be detected by the '1-1'-st image detection unit 122A. If the '1-1'-st image is not included in the peripheral image, the '1-1'-st image may not be detected by the '1-1'-st image detection unit 122A.

If the peripheral image includes both the '1-1'-st image and the '2-1'-st image according to the situation in the vicinity of the vehicle, that is, if the upper and lower bodies of the moving object located in the vicinity of the vehicle are all contained in the peripheral image, the image extraction unit 120, 120A may extract at least one of a first image related to the upper body or a second image related to the lower body. The embodiment 220A shown in FIG. 7 detects only the second image without detecting the first image, even if both the first image and the second image are contained in the peripheral image. For example, as shown in FIGS. 5A and 5B, when both the first image and the second image are contained in the peripheral image, the image extraction unit 120A may detect only the second image I21. However, embodiments are not limited thereto.

According to another embodiment, when both the first image and the second image are contained in the peripheral image, the image extraction unit 120A may detect only the first image without detecting the second image. For example, as illustrated in FIGS. 4A and 4B, when the moving object MB is squatting, only the first image I11 may be detected in the peripheral image because the lower body is hidden.

According to another embodiment, when both the first image and the second image are contained in the peripheral image, the image extraction unit 120A may detect both the first image and the second image.

After step 306, the '1-1'-st image verification unit 124A may verify the '1-1'-st image detected by the '1-1'-st image detection unit 122A, and output the verified result to the '1-2'-nd image detection unit 126A (step 308). In addition, after step 314, the '2-1'-st image verification unit 124B may verify the '2-1'-st image detected by the '2-1'-st image detection unit 122B and output the verified result to the '2-2'-nd image detection unit 126B (step 316).

After step 308, the '1-2'-nd image detection unit 126A detects the '1-2'-nd image from the '1-1'-st image that is verified by the '1-1'-st image verification unit 124A (step 310). In addition, after step 316, the '2-2'-nd image detection unit 126B detects the '2-2'-nd image from the '2-1'-st image verified by the '2-1'-st image verification unit 124B (step 318).

At least one of the '1-1'-st image verification unit 124A or the '2-1'-st image verification unit 124B shown in FIG. 6 and at least one of step 308 or step 316 shown in FIG. may be omitted. In the case where the '1-1'-st image verification unit 124A and step 308 are omitted, after step 306, the '1-2'-nd image detection unit 126A detects the '1-2'-nd image from the '1-1'-st image detected by the '1-1'-st image detection unit 122A (step 310). In the case where the '2-1'-st image verification unit 124B and step 316 are omitted, after step 314, the '2-2'-nd image detection unit 126B detects the '2-2'-nd image from the '2-1'-st image detected by the '2-1'-st image detection unit 122B (step 318).

After step 310, the '1-2'-nd image verification unit 128A may verify the '1-2'-nd image detected by the '1-2'-nd image detection unit 126A, and output the verified result to the moving object information determination unit 130 via an output terminal OUT11. (step 312). After step 318, the '2-2'-nd image verification unit 128B verifies the '2-2'-nd image detected by the '2-2'-nd image detection unit 126B, and outputs the verified result to the moving object information determination unit 130 via an output terminal OUT21 (step 320).

According to another embodiment, at least one of the first '1-2'-nd image verification unit 128A or the second '2-2'-nd image verification unit 128B shown in FIG. 6 may be omitted, and at least one of step 312 or step 320 shown in FIG. 7 may be omitted.

According to another embodiment, the '1-1'-st image detection unit 122A, the '1-1'-st image verification unit 124A, the '2-1'-st image detection unit 122B, and the '2-1'-st image verification unit 124B shown in FIG. 6 may be omitted, and steps 306, 308, 314, and 316 shown in FIG. 7 may be omitted. In this case, the '1-2'-nd image detection unit 126A may detect the '1-2'-nd image from the peripheral image provided via the input terminal IN1, and the '2-2'-nd image detection unit 126B may detect the '2-2'-nd image from the peripheral image provided via the input terminal IN1. The first '1-2'-nd image verification unit 128A and the second '2-2'-nd image verification unit 128B operate as described above. Therefore, the image extraction unit 120A may not provide the '1-1'st and '2-1'-st images but may provide at least one of the '1-2'-nd or '2-2'-nd image to the moving object information determination unit 130.

According to another embodiment, the first '1-2'-nd image detection unit 126A, the '1-2'-nd image verification unit 128A, the '2-2'-nd image detection unit 126B, and the '2-2'-nd image verification unit 128B shown in FIG. 6 may be omitted, and steps 310, 312, 318, and 320 shown in FIG. 7 may be omitted. In this case, the first '1-1'-st image verified by the '1-1'-st image verification unit 124A may be output to the moving object information determination unit 130 via the output terminal OUT11, and the '2-1'-st image verified by the '2-1'-st image verification unit 124B may be output to the moving object information determination unit 130 via the output terminal OUT21. Therefore, the image extraction unit 120A may not provide the '1-2'-nd and '2-2'-nd images but may provide at least one of the '1-1'st or '2-1'-st image to the moving object information determination unit 130.

There are various methods of detecting the corresponding images in the '1-1'-st image detection unit 122A, the '1-2'-nd image detection unit 126A, the '2-1'-st image detection unit 122B, and the '2-2'-nd image detection unit 126B. For example, a formatted pattern of each of the '1-1'st, '1-2'-nd, '2-1'-st, and '2-2'-nd images may be pre-created and stored for each type of moving object, and the stored pattern may be compared with the pattern of the peripheral image to detect the '1-1'st, '1-2'-nd, '2-1'-st, or '2-2'-nd image from the peripheral image.

Generally, the pattern of the '1-1'-st image is larger than the pattern of the '1-2'-nd image, and the pattern of the '2-1'-st image is larger than the pattern of the '2-2'-nd image. If the '1-2'-nd image (or the '2-2'-nd image) is detected directly from the peripheral image rather than from the '1-1'-st image (or the '2-1'-st image), the small pattern of the '1-2'-nd image (or the '2-2'-nd image) needs to be directly compared with the pattern of the peripheral image, and thus the amount of computation may be increased. However, in the embodiment shown in FIGS. 6 and 7, the pattern of the '1-2'-nd image (or the '2-2'-nd image) is not directly compared with the peripheral image. Instead, the '1-1'-st image (or the '2-1'-st image) is first detected by comparing the pattern of the '1-1'-st image (or the '2-1'-st image) with the peripheral image, and then the pattern of the '1-2'-nd image (or the '2-2'-nd image) is compared with the pattern of the '1-1'-st image (or the '2-1'-st image), which is smaller than the pattern of the peripheral image. Therefore, the amount of computation needed to detect the '1-2'-nd image (or the '2-2'-nd image) may be reduced.

Figure 8:
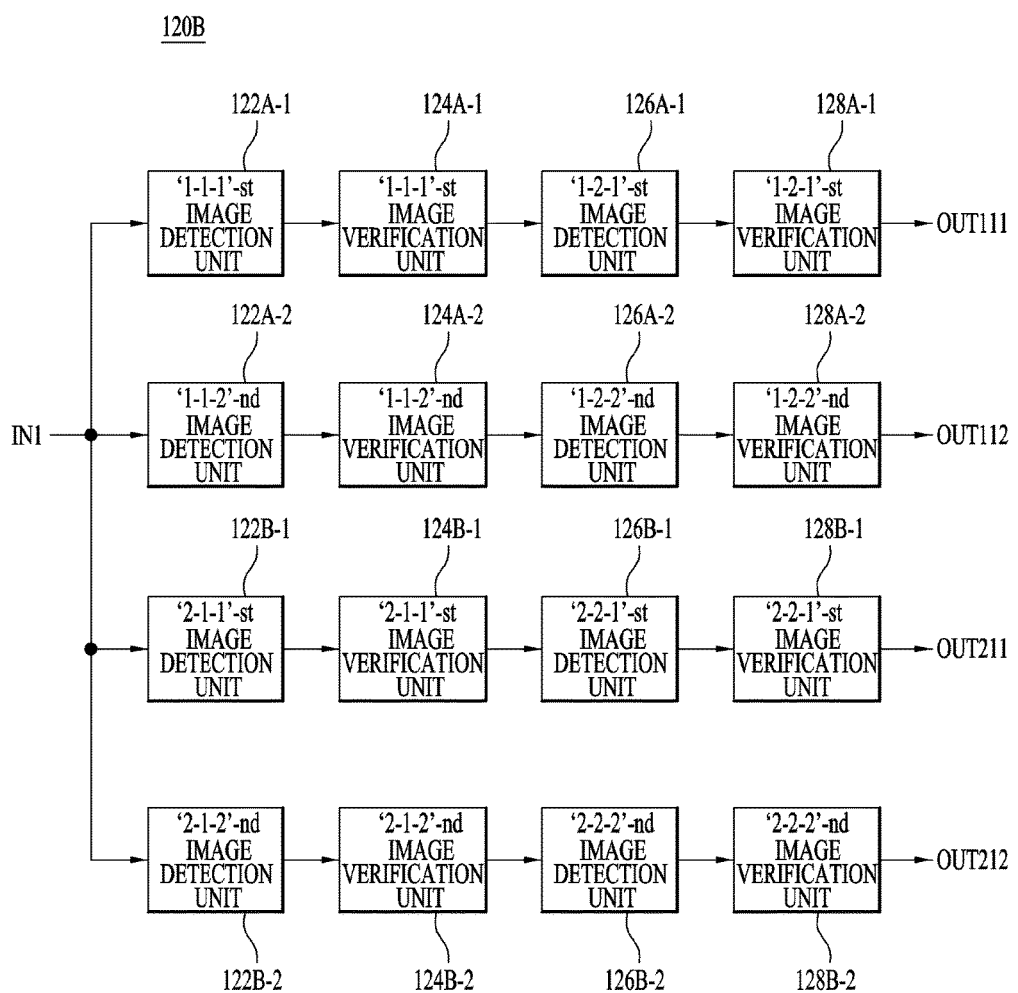
FIG. 8 is a block diagram of another embodiment of the image extraction unit shown in FIG. 1.

FIG. 8 is a block diagram of another embodiment 120B of the image extraction unit 120 shown in FIG. 1, which may include '1-1-1'-st and '1-1-2'-nd image detection units 122A-1 and 122A-2, '1-1-1'-st and '1-1-2'-nd image verification units 124A-1 and 124A-2, '1-2-1'-st and '1-2-2'-nd image detection units 126A-1 and 126A-2, '1-2-1'-st and '1-2-2'-nd image verification units 128A-1 and 128A-2, '2-1-1'-st and '2-1-2'-nd image detection units 122B-1 and 122B-2, '2-1-1'-st and '2-1-2'-nd image verification units 124B-1 and 124B-2, '2-2-1'-st and '2-2-2'-nd image detecting units 126B-1 and 126B-2, and '2-2-1'-st and '2-2-2'-nd image verification units 128B-1, 128B-2.

Figure 9:
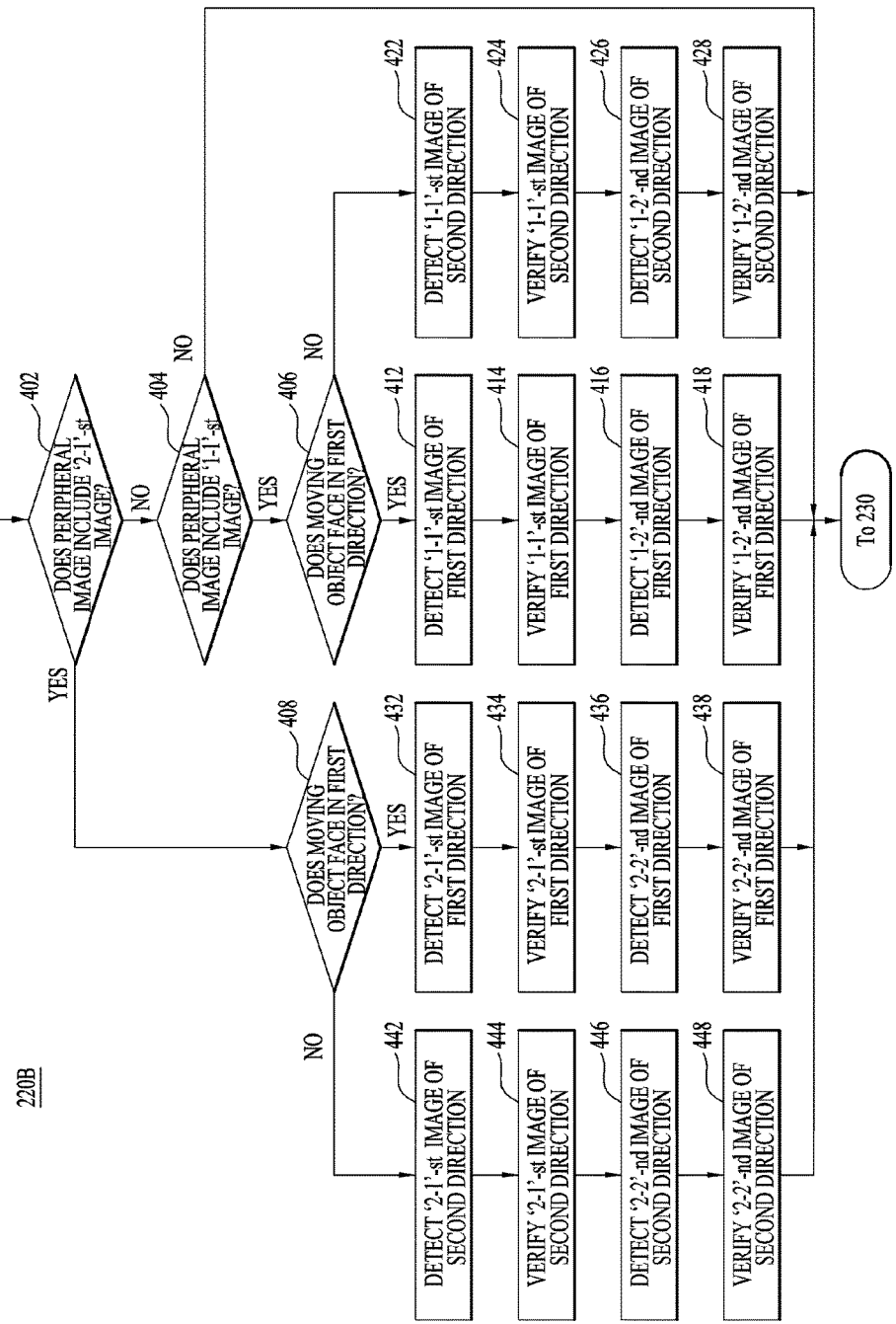
FIG. 9 is a flowchart illustrating another embodiment of step 220 of FIG. 2.

FIG. 9 is a flowchart illustrating another embodiment 220B of step 220 shown in FIG. 2.

Hereinafter, step 220B shown in FIG. 9 is described as being performed by the image extraction unit 120B shown in FIG. 8, but embodiments are not limited thereto. That is, step 220B shown in FIG. 9 may be performed by the image extraction unit 120 having a different configuration from the image extraction unit 120B shown in FIG. 8. The image extraction unit 120B shown in FIG. 8 is described as operating in the order shown in FIG. 9, but embodiments are not limited thereto. That is, according to another embodiment, the image extraction unit 120B shown in FIG. 8 may operate in a different order from the method 220B shown in FIG. 9.

The image extraction unit 120B shown in FIG. 8 may receive an peripheral image acquired by the image acquisition unit 110 via the input terminal IN1, and extract from the acquired peripheral image at least one of a first image or a second image for each direction in which the moving object faces with respect to the vehicle. For simplicity, the direction in which the front surface of the moving object faces the vehicle is defined as a first direction, and a direction different from the first direction is defined as a second direction. Accordingly, when the moving object faces the vehicle, that is, when the moving object faces in the first direction, the peripheral image includes a front image of the moving object. When the moving object faces away from the vehicle or a side of the moving object faces the vehicle, that is, when the moving object faces in the second direction, the peripheral image may include a side image or rear image of the moving object. Thus, the image extraction unit 120B may extract at least one of the first image or the second image for each direction in which the moving object faces.

First, it is determined whether the peripheral image obtained by the image acquisition unit 110 may include a '2-1'-st image (step 402). If the peripheral image includes the '2-1'-st image, it is determined whether the moving object faces in the first direction (step 408). If the moving object faces in the first direction, the '2-1-1'-st image detection unit 122B-1 detects the '2-1'-st image in the first direction from the peripheral image received from the image acquisition unit 110 via the input terminal IN1 (step 432).

Steps 402, 408, and 432 are performed by the '2-1-1'-st image detection unit 122B-1 for the following reason. If the peripheral image includes the '2-1'-st image of the whole lower body of the moving object facing in the first direction, the '2-1-1'-st image detection unit 122B-1 may detect the '2-1'-st image in the first direction. However, if the '2-1'-st image in the first direction is not included in the peripheral image, the '2-1-1'-st image detection unit 122B-1 cannot detect the '2-1'-st image in the first direction.

On the other hand, if the peripheral image includes the '2-1'-st image but the moving object faces in the second direction rather than in the first direction, the '2-1-2'-nd image detection unit 122B-2 detects the '2-1' image in the second direction different from the first direction from the peripheral image received from the acquisition unit 110 via the input terminal IN1 (Step 442).

Steps 402, 408, and 442 are performed by the '2-1-2'-nd image detection unit 122B-2 for the following reason. If the peripheral image includes the '2-1'-st image of the whole lower body of the moving object facing in the second direction, the '2-1-2'-nd image detection unit 122B-2 may detect the '2-1'-st image in the second direction. However, if the '2-1'-st image in the second direction is not included in the peripheral image, the '2-1-2'-nd image detection unit 122B-2 cannot detect the '2-1'-st image in the second direction.

If the peripheral image does not include the '2-1'-st image, it is determined whether the peripheral image includes the '1-1'-st image (step 404). If the peripheral image includes the '1-1'-st image, it is determined whether the moving object faces in the first direction (step 406). If the moving object faces in the first direction, the '1-1-1'-st image detection unit 122A-1 detects the '1-1'-st image in the first direction from the peripheral image received from the image acquisition unit 110 via the input terminal IN1 (step 412).

Steps 402, 404, 406, and 412 are performed by the '1-1-1'-st image detection unit 122A-1 for the following reason. If the '1-1'-st image of the whole upper body of the moving object facing in the first direction is included in the peripheral image, the '1-1-1'-st image detection unit 122A-1 may detect the '1-1'-st image in the first direction. However, if the '1-1'-st image in the first direction is not included in the peripheral image, the '1-1-1'-st image detection unit 122A-1 cannot detect the '1-1'-st image in the first direction.

On the other hand, if the peripheral image includes the '1-1'-st image but the moving object faces in the second direction different from the first direction, the '1-1-2'-nd image detection unit 122A-2 detects the '1-1' image in the second direction from the peripheral image received from the first image sensor 110 via the input terminal IN1 (step 422).

Steps 402, 404, 406, and 422 are performed by the '1-1-2'-nd image detection unit 122A-2 for the following reason. If the '1-1'-st image of the whole upper body of the moving object facing in the second direction is included in the peripheral image, the '1-1-2'-nd image detection unit 122A-2 may detect the '1-1'-st image in the second direction. However, if the '1-1'-st image in the second direction is not included in the peripheral image, the '1-1-2'-nd image detection unit 122A-2 cannot detect the '1-1'-st image in the second direction.

While it is illustrated in step 220B shown in FIG. 9 that the first image is not detected and only the second image is detected when both the first image and the second image are contained in the peripheral image, embodiments are not limited thereto. That is, according to another embodiment, when both the first image and the second image are contained in the peripheral image, only the first image may be detected without detecting the second image. According to another embodiment, when both the first image and the second image are contained in the peripheral image, both the first image and the second image may be detected.

After step 412, the '1-1-1'-st image verification unit 124A-1 may verify the '1-1'-st image in the first direction as detected by the '1-1-1'-st image detection unit 122A-1, and output a verified result to the '1-2-1'-st image detection unit 126A-1 (step 414). After step 432, the '2-1-1'-st image verification unit 124B-1 may verify the '2-1'-st image in the first direction as detected by the '2-1-1'-st image detection unit 122B-1 and output a verified result to the '2-2-1'-st image detection unit 126B-1 (step 434).

After step 422, the '1-1-2'-nd image verification unit 124A-2 may verify the '1-1'-st image in the second direction as detected by the '1-1-2'-nd image detection unit 122A-2 and output a verified result to the '1-2-2'-nd image detection unit 126A-2 (step 424).

After step 442, the '2-1-2'-nd image verification unit 124B-2 may verify the '2-1'-st image in the second direction as detected by the '2-1-2'-nd image detection unit 122B-2 and output a verified result to the '2-2-2'-nd image detection unit 126B-2 (step 444).

After step 414, the '1-2-1'-st image detection unit 126A-1 detects the '1-2'-nd image in the first direction from the '1-1'-st image in the first direction, which is verified by the '1-1-1'-st image verification unit 124A-1 (step 416).

After step 424, the '1-2-2'-nd image detection unit 126A-2 detects the '1-2'-nd image in the second direction from the '1-1'-st image in the second direction, which is verified by the '1-1-2'-nd image verification unit 124A-2, (step 426).

After step 434, the '2-2-1'-st image detection unit 126B-1 may detect the '2-2'-nd image in the first direction from the '2-1'-st image in the first direction, which is verified by the '2-1-1'-st image verification unit 124B-1, and output the verified '2-2'-nd image in the first direction to the '2-2-1'-st image verification unit 128B-1 (step 436).

After step 444, the '2-2-2'-nd image detection unit 126B-2 detects the '2-2'-nd image in the second direction from the '2-1'-st image in the second direction, which is verified by the '2-1-2'-nd image verification unit 124B-2, and outputs the detected image to the '2-2-2'-nd image verification unit 128B-2 (step 446).

In some cases, at least one of the '1-1-1'-st, '1-1-2'-nd, '2-1-1'-st or '2-1-2'-nd image verification unit 124A-1, 124A-2, 124B-1, or 124B-2 shown in FIG. 8 may be omitted, and at least one of step 414, 424, 434, or 444 shown in FIG. 9 may be omitted.

If the '1-1-1'-st image verification unit 124A-1 and step 414 are omitted, the '1-2-1'-st image detection unit 126A-1 may detect the '1-2'-nd image in the first direction from the '1-1'-st image in the first direction as detected by the '1-1-1'-st image detection unit 122A-1, and output the detected '1-2'-nd image in the first direction to the '1-2-1'-st image detection unit 128A-1.

If the '1-1-2'-nd image verification unit 124A-2 and step 424 are omitted, the '1-2-2'-nd image detection unit 126A-2 may detect the '1-2'-nd image in the second direction from the '1-1'-st image in the second direction as detected by the '1-1-2'-nd image detection unit 122A-2 and output the detected '1-2'-nd image in the second direction to the '1-2-2'-nd image detection unit 128A-2.

If the '2-1-1'-st image verification unit 124B-1 and step 434 are omitted, the '2-2-1'-st image detection unit 126B-1 may detect the '2-2'-nd image in the first direction from the '2-1'-st image in the first direction as detected by the '2-1-1'-st image detection unit 122B-1, and output the detected '2-2'-nd image in the first direction to the '2-2-1'-st image verification unit 128B-1.

If the '2-1-2'-nd image verification unit 124B-2 and step 444 are omitted, the '2-2-2'-nd image detection unit 126B-2 may detect the '2-2'-nd image in the second direction from the '2-1'-st image in the second direction as detected by the '2-1-2'-nd image detection unit 122B-2, and output the detected '2-2'-nd image in the second direction to the '2-2-2'-nd image verification unit 128B-2.

According to another embodiment, the '1-1-1'-st image detection unit 122A-1, the '1-1-1'-st image verification unit 124A-1, the '1-1-2'-nd image detection unit 122A-2, the '1-1-2'-nd image verification unit 124A-2, the '2-1-1'-st image detection unit 122B-1, the '2-1-1'-st image verification unit 124B-1, the '2-1-2'-nd image detection unit 122B-2 and the '2-1-2'-nd image verification unit 124B-2 shown in FIG. 8 may be omitted. That is, steps 412, 414, 422, 424, 432, 434, 442 and 444 shown in FIG. 9 may be omitted. In this case, the '1-2-1'-st image detection unit 126A-1 may detect the '1-2'-nd image in the first direction from the peripheral image provided via the input terminal IN1 (step 416), and the '1-2-2'-nd image detection unit 126A-2 may detect the '1-2'-nd image in the second direction from the peripheral image provided via the input terminal IN1 (step 426). In addition, the '2-2-1'-st image detection unit 126B-1 may detect the '2-2'-nd image in the first direction from the peripheral image provided via the input terminal IN1 (step 436), and the '2-2-2'-nd image detection unit 126B-2 may detect the '2-2'-nd image in the second direction from the peripheral image provided via the input terminal IN1 (step 446). Therefore, the image extraction unit 120B may not provide the '1-1'-st and '2-1'-st images, but may provide at least one of the '1-2'-nd or '2-2'-nd image in the first or second direction to the moving object information determination unit 130.

According to another embodiment, the '1-2-1'-st image detection unit 126A-1, the '1-2-1'-st image verification unit 128A-1, the '1-2-2'-nd image detection unit 126A-2, the '1-2-2'-nd image verification unit 128A-2, the '2-2-1'-st image detection unit 126B-1, the '2-2-1'-st image verification unit 128B-1, the '2-2-2'-nd image detection unit 126B-2 and the '2-2-2'-nd image verification unit 128B-2 shown in FIG. 8 may be omitted. That is, steps 416, 418, 426, 428, 436, 438, 446, and 448 shown in FIG. 9 may be omitted. In this case, the '1-1'-st image in the first direction, which is verified by the '1-1-1'-st image verification unit 124A-1, may be output to the moving object information determination unit 130 via the output terminal OUT111, and the '1-1'-st image in the second direction, which is verified by the '1-1-2'-nd image verification unit 124A-2, may be output to the moving object information determination unit 130 via the output terminal OUT112. The '2-1'-st image in the first direction, which is verified by the '2-1-1'-st image verification unit 124B-1, may be output to the moving object information determination unit 130 via the output terminal OUT211, and the '2-1'-st image in the second direction, which is verified by the '2-1-2'-nd image verification unit 124B-2, may be output to the moving object information determination unit 130 via the output terminal OUT212. Therefore, the image extraction unit 120B may not provide the '1-2'-nd image and the '2-2'-nd image, but may provide at least one of the '1-1'-st or '2-1'-st image in the first or second direction to the moving object information determination unit 130.

After step 416, the '1-2-1'-st image verification unit 128A-1 may verify the '1-2'-nd image in the first direction detected by the '1-2-1'-st image detection unit 126A-1, and output the verified result to the moving object information determination unit 130 via the output terminal OUT111 (step 418).

After step 426, the '1-2-2'-nd image verification unit 128A-2 may verify the '1-2'-nd image in the second direction detected by the '1-2-2'-nd image detection unit 126A-2, and output the verified result to the moving object information determination unit 130 via the output terminal OUT112 (step 428).

After step 436, the '2-2-1'-st image verification unit 128B-1 may verify the '2-2'-nd image in the first direction detected by the '2-2-1'-st image detection unit 126B-1, and output the verified result to the moving object information determination unit 130 via the output terminal OUT 211 (step 438).

After step 446, the '2-2-2'-nd image verification unit 128B-2 may verify the '2-2'-nd image in the second direction detected by the '2-2-2'-nd image detection unit 126B-2, and output the verified result to the moving object information determination unit 130 via the output terminal OUT 212 (step 448).

In some cases, at least one of the '1-2-1'-st, '1-2-2'-nd, '2-2-1'-st, or '2-2-2'-nd image verification unit 128A-1, 128A-2, 128B-1, or 128B-2 may be omitted.

Figure 10:
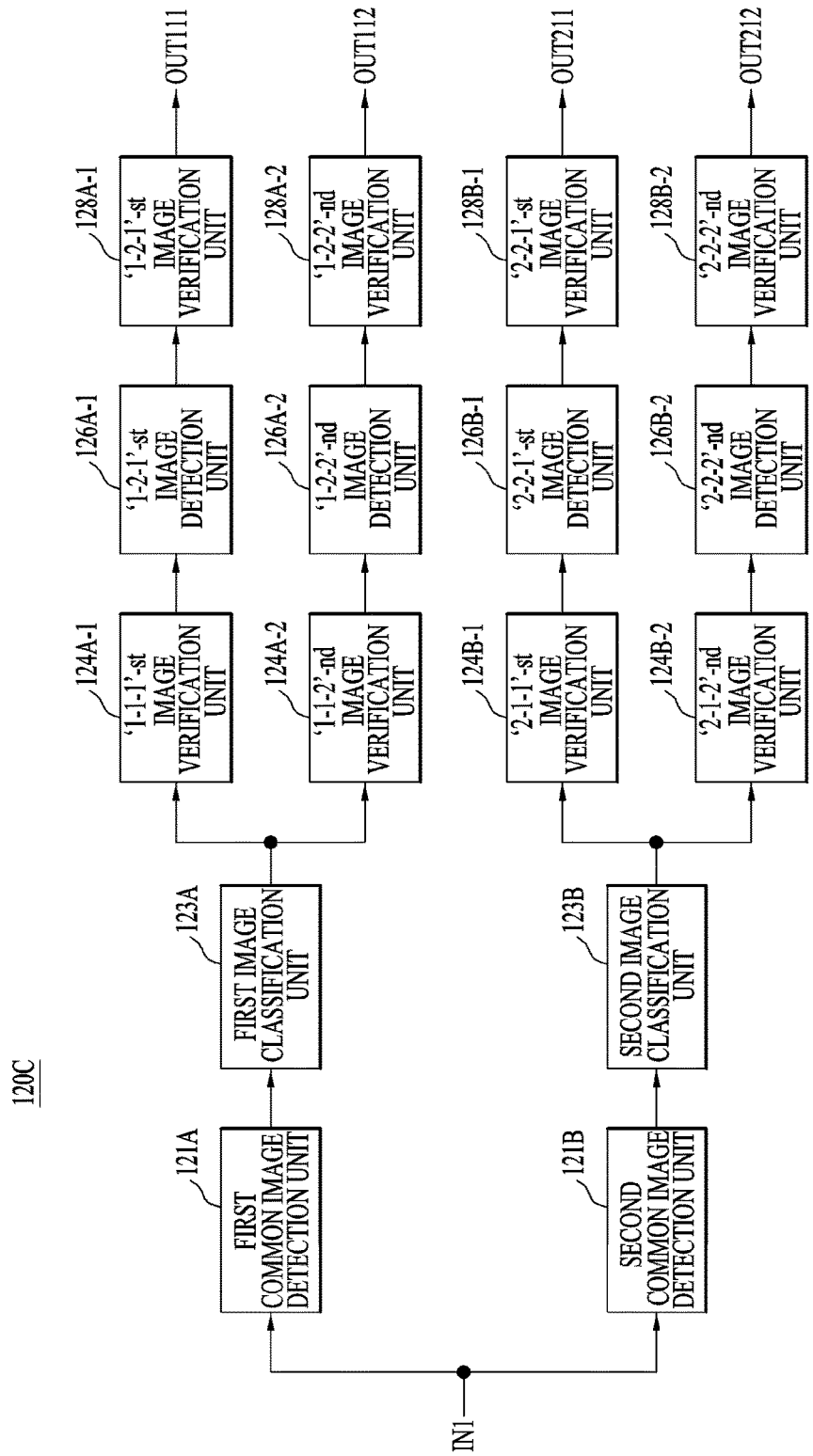
FIG. 10 is a block diagram of another embodiment of the image extraction unit shown in FIG. 1.

FIG. 10 is a block diagram of another embodiment 120C of the image extraction unit 120 shown in FIG. 1, which may include first and second common image detection units 121A and 121B, first and second image classification units 123A and 123B, '1-1-1'-st and '1-1-2'-nd image verification units 124A-1 and 124A-2, '1-2-1'-st and '1-2-2'-nd image detection units 126A-1 and 126A-2, '1-2-1'-st and '1-2-2'-nd image verification units 128A-1 and 128A-2, '2-1-1'-st and the '2-1-2'-nd image verification units 124B-1, and 124B-2, '2-2-1'-st and '2-2-2'-nd image detection units 126B-1 and 126B-2, and '2-2-1'-st and '2-2-2'-nd image verification units 128B-1 and 128B-2.

Figure 11:
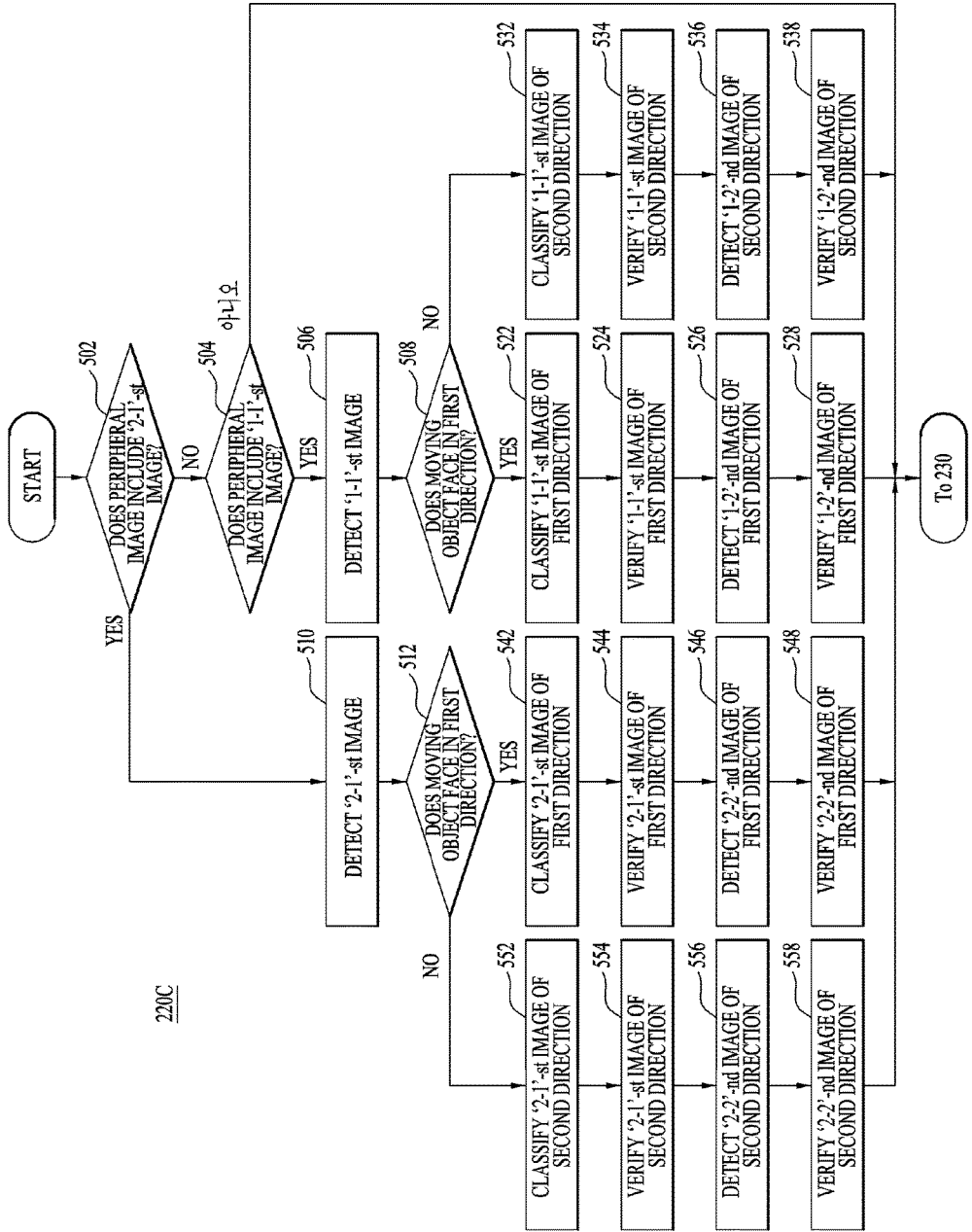
FIG. 11 is a flowchart illustrating another embodiment of step 220 of FIG. 2.

FIG. 11 is a flowchart illustrating another embodiment 220C of step 220 shown in FIG. 2.

Hereinafter, step 220C shown in FIG. 11 is described as being performed by the image extraction unit 120C shown in FIG. 10, but embodiments are not limited thereto. That is, step 220C shown in FIG. 11 may be performed by the image extraction unit 120 having a different configuration from the image extraction unit 120C shown in FIG. 10. While the image extraction unit 120C shown in FIG. 10 is described as operating in the order shown in FIG. 11, embodiments are not limited thereto. That is, according to another embodiment, the image extraction unit 120C shown in FIG. 10 may operate in a different order from the method 220C shown in FIG. 11.

First, it is determined whether an peripheral image acquired by the image acquisition unit 110 includes a '2-1'-st image (step 502). If the peripheral image includes the '2-1'-st image, the second common image detection unit 121B detects the '2-1'-st image from the peripheral image received from the image acquisition unit 110 through an input terminal IN1 (step 510).

Steps 502 and 510 may be performed by the second common image detection unit 121B for the following reason. If the '2-1'-st image of the whole lower body of the moving object is included in the peripheral image, the second common image detection unit 121B may detect the '2-1'-st image. However, if the '2-1'-st image is not included in the peripheral image, the second common image detection unit 121B may not detect the '2-1'-st image.

If the peripheral image does not include the '2-1'-st image, it is determined whether the peripheral image includes the '1-1'-st image (step 504). If the peripheral image includes the '1-1'-st image, the first common image detection unit 121A detects the '1-1'-st image from the peripheral image received from the image acquisition unit 110 via the input terminal IN1 (step 506).

Steps 502, 504, and 506 are performed by the first common image detection unit 121A for the following reason. If the '1-1'-st image of the whole upper body of the moving object is included in the peripheral image, the first common image detection unit 121A may detect the '1-1'-st image. However, if the '1-1'-st image is not included in the peripheral image, the first common image detection unit 121A does not detect the '1-1'-st image.

While it is illustrated in step 220C shown in FIG. 11 that the first image is not detected and only the second image is detected from the peripheral image when both the first image and the second image are contained in the peripheral image, embodiments are not limited thereto.

According to another embodiment, when both the first image and the second image are contained in the peripheral image, only the first image may be detected without detecting the second image.

According to another embodiment, when both the first image and the second image are contained in the peripheral image, both the first image and the second image may be detected.

After step 506, it is determined whether the moving object faces in the first direction (step 508). If the moving object faces in the first direction, the first image classification unit 123A classifies the '1-1'-st image in the first direction from the '1-1'-st image detected by the first common image detection unit 121A and outputs the classified first '1-1'-st image in the first direction to the '1-1-1'-st image verification unit 124A-1 (step 522). However, if the moving object faces in the second direction, the first image classification unit 123A classifies the '1-1'-st image in the second direction from the '1-1'-st image detected by the first common image detection unit 121A and outputs the classified first '1-1'-st image in the second direction to the '1-1-2'-nd image verification unit 124A-2 (step 532). In this way, the first image classification unit 123A serves to classify the '1-1'-st image according to the direction in which the moving object faces.

Here, the first and second directions are the same as those described regarding the image extraction unit 120B and the method 220B of the moving object information providing device for a vehicle according to the embodiment shown in FIGS. 8 and 9.

Steps 508, 522 and 532 are performed by the first image classification unit 123A for the following reason. If the moving object contained in the peripheral image including the '1-1'-st image faces in the first or second direction, the first image classification unit 123A is capable of classifying the moving object according to the direction in which the moving object faces.

In order to perform the operations described above, the first image classification unit 123A may pre-store formatted patterns of the '1-1'-st image in the first direction and the second direction, and compare the pre-stored patterns with the pattern of the '1-1'-st image detected by the first common image detection unit 121A to classify the '1-1'-st image in the first or second direction.

After step 510, it is determined whether the moving object faces in the first direction (step 512). If the moving object faces in the first direction, the second image classification unit 123B classifies the '2-1'-st image in the first direction from the '2-1'-st image detected by the second common image detection unit 121B, and outputs the '2-1'-st image in the first direction to the '2-1-1'-st image verification unit 124B-1 (step 542). On the other hand, if the moving object faces in the second direction, the second image classification unit 123B classifies the '2-1'-st image in the second direction from the '2-1'-st image detected by the second common image detection unit 121B, and outputs the classified '2-1'-st image in the second direction to the '2-1-2'-nd image verification unit 124B-2 (Step 552). In this way, the second image classifier 123B serves to classify the '2-1'-st image according to the direction in which the moving object faces.

Steps 512, 542, and 552 are performed by the second image classifier 123B for the following reason. If the moving object contained in the peripheral image including the '2-1'-st image faces in the first or second direction, the second image classification unit 123B is capable of classifying the moving object according to the direction in which the moving object faces.

In order to perform the operations described above, the second image classification unit 123B may pre-store formatted patterns of the '2-1'-st image in the first direction and the second direction, and compare the pre-stored patterns with the pattern of the '2-1'-st image detected by the second common image detection unit 121B to classify the '2-1'-st image in the first or second direction.

The '1-1-1'-st and '1-1-2'-nd image verification units 124A-1 and 124A-2, the '1-2-1'-st and '1-2-2'-nd image detection units 126A-1 and 126A-2, the '1-2-1'-st and '1-2-2'-nd image verification units 128A-1 and 128A-2, the '2-1-1'-st and '2-1-2'-nd image verification units 124B-1 and 124B-2, the '2-2-1'-st and '2-2-2'-nd image detection units 126B-1 and 126B-2, and the '2-2-1'-st and '2-2-2'-nd image verification units 128B-1 and 128B-2 shown in FIG. 10 are identical to the '1-1-1'-st and '1-1-2'-nd image verification units 124A-1 and 124A-2, the '1-2-1'-st and d image detection units 126A-1 and 126A-2, the '1-2-1'-st and '1-2-2'-nd image verification units 128A-1 and 128A-2, the '2-1-1'-st and '2-1-2'-nd image verification units 124B-1 and 124B-2, the '2-2-1'-st and '2-2-2'-nd image detection units 126B-1 and 126B-2, and the '2-2-1'-st and '2-2-2'-nd image verification units 128B-1 and 128B-2 shown in FIG. 8, respectively, and perform the same functions. Therefore, they are assigned the same reference numerals and a redundant description thereof is omitted.

Steps 524, 526, 528, 534, 536, 538, 544, 546, 548, 554, 556 and 558 shown in FIG. 11 are the same as steps 414, 416, 418, 424, 426, 428, 434, 436, 438, 444, 446 and 448 shown in FIG. 9, respectively, and therefore a detailed description thereof is omitted.

That is, after step 522, the '1-1-1'-st image verification unit 124A-1 may verify the '1-1'-st image in the first direction classified by the first image classification unit 123A, and output the verified result to the '1-2-1'-st image detection unit 126A-1 (step 524). After step 542, the '2-1-1'-st image verification unit 124B-1 may verify the '2-1'-st image in the first direction classified by the second image classification unit 123B, and output the verified result to the '2-2-1'-st image detection unit 126B-1 (step 544).

After step 532, the '1-1-2'-nd image verification unit 124A-2 may verify the '1-1'-st image in the second direction detected by the first image classification unit 123A, and output the verified result to the '1-2-2'-nd image detection unit 126A-2 (step 534). After step 552, the '2-1-2'-nd image verification unit 124B-2 may verify the '2-1'-st image in the second direction detected by the second image classification unit 123B, and output the verified result to the '2-2-2'-nd image detection unit 126B-2 (step 554).

In the case of the embodiment shown in FIGS. 8 and 9, in order to detect the '1-1'-st image in the first or second direction or the '2-1'-st image in the first or second direction, the first pattern of the '1-1'-st image in the first or second direction or the second pattern of the '2-1'-st image in the first or second direction is compared with the whole pattern of the peripheral image, and therefore the amount of computation is increased. On the other hand, in the case of the embodiment shown in FIGS. 10 and 11, the '1-1'-st or '2-1'-st image is detected from the peripheral image, and then the first pattern of the '1-1'-st image in the first or second direction or the second pattern of the '2-1'-st image in the first or second direction is compared with the pattern of the detected '1-1'-st or '2-1'-st image instead of the whole pattern of the peripheral image. Therefore, the amount of computation may be reduced. In addition, in terms of the time required to provide the first or second image to the moving object information determination unit 130 as well as the computation amount, the embodiment shown in FIGS. 10 and 11 may be more advantageous than the embodiment shown in FIGS. 8 and 9.

While it is described in the embodiments shown in FIGS. 8 to 11 that there are two directions in which the moving object faces, which are the first and second directions, embodiments are not limited thereto. That is, the direction in which the moving object faces may vary. For example, the second direction different from the first direction in which the moving object faces the front of the vehicle as described above may include a '2-1'-st direction, in which the moving object faces away from the vehicle, a '2-2'-nd direction in which the right side of the moving object faces the vehicle, and a '2-3'-rd direction in which the left side of the moving object faces the vehicle.

In the case of FIGS. 8 to 11, since there are two directions in which the moving object may face (i.e., the first and second directions), it is illustrated that the number of image detection units for detecting the '1-1'-st, '1-2'-nd, '2-1'-st and '2-2'-nd images and the number of image verification units for verifying each of images are two, respectively. However, when there are four kinds of directions in which the moving object faces (that is, the first direction and the '2-1'-st to '2-3'-rd directions) as described above, the number of image detection units for detecting the '1-1'-st, '1-2'-nd, '2-1'-st and '2-2'-nd images and the number of image verification units for verifying each of images may be four, respectively.

Figure 12:
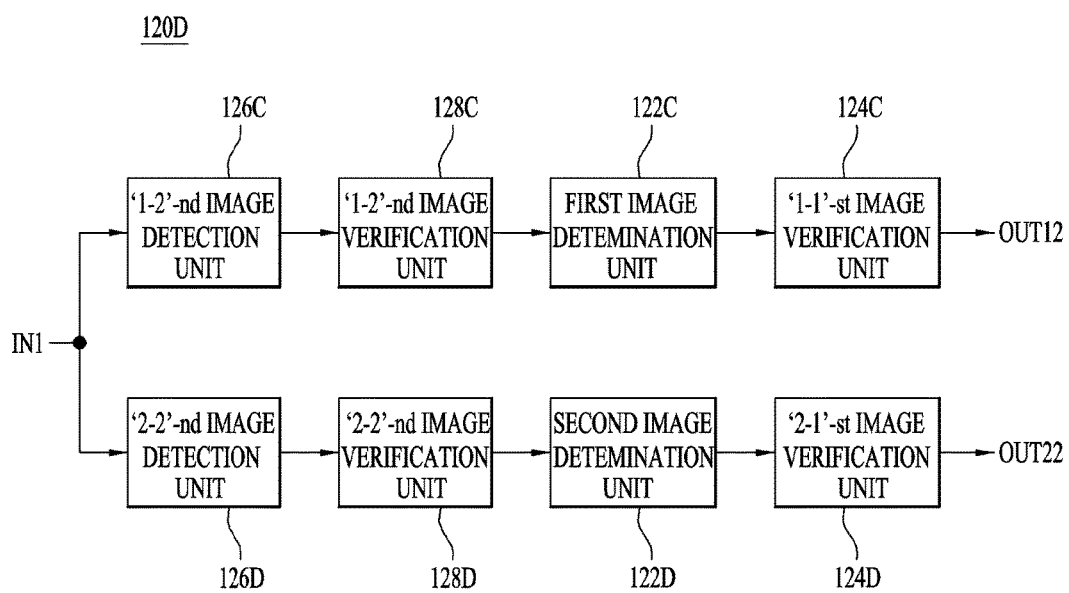
FIG. 12 is a block diagram of another embodiment of the image extraction unit shown in FIG. 1.

FIG. 12 is a block diagram of another embodiment 120D of the image extraction unit 120 shown in FIG. 1, which may include '1-2'-nd and '2-2'-nd image detection units 126C and 126D, '1-2'-nd and '2-2'-nd image verification units 128C and 128D, first and second image determination units 122C and 122D, and '1-1'-st and '2-1'-st image verification units 124C and 124D.

Figure 13:
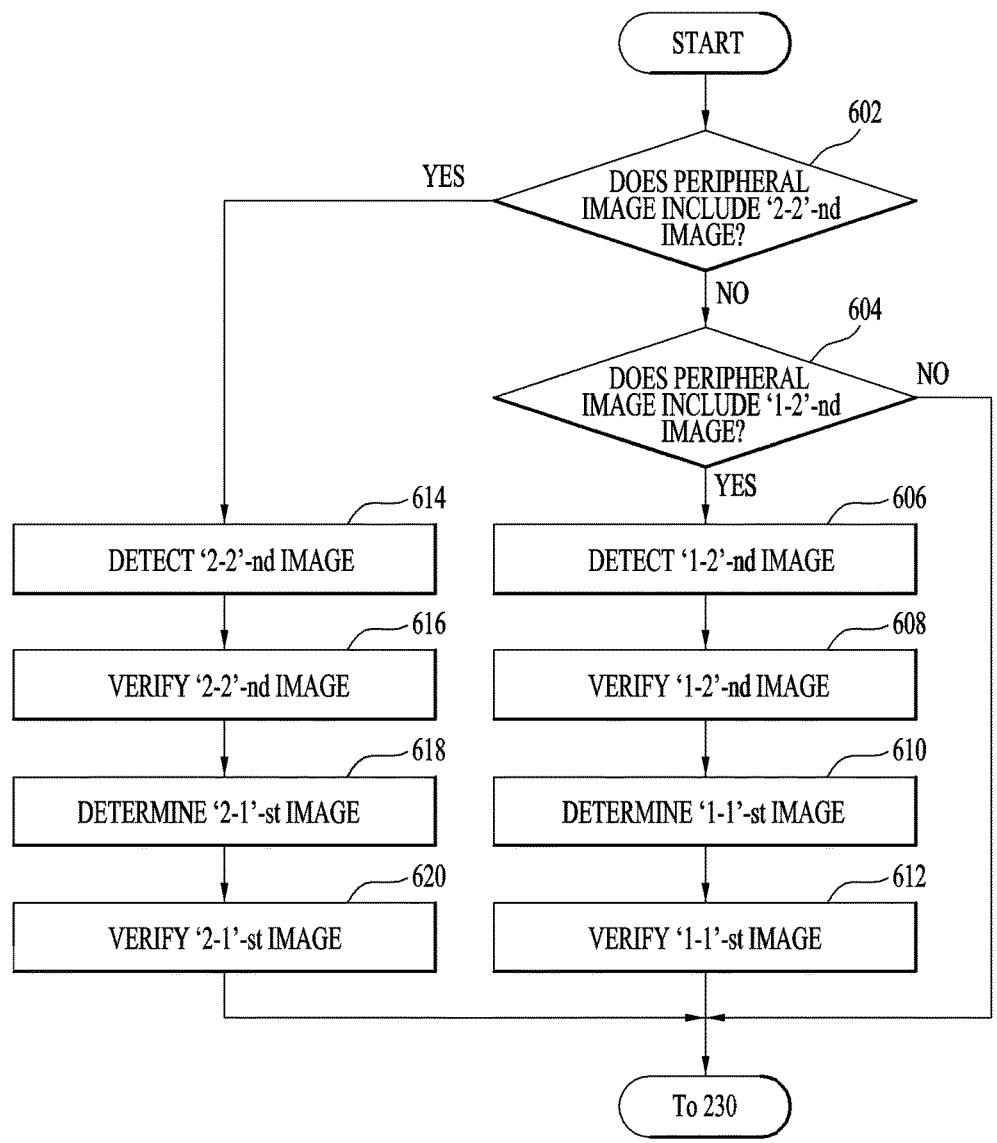
FIG. 13 is a flowchart illustrating another embodiment of step 220 of FIG. 2.

FIG. 13 is a flowchart illustrating another embodiment 220D of step 220 shown in FIG. 2.

Hereinafter, step 220D shown in FIG. 13 is described as being performed by the image extraction unit 120D shown in FIG. 12, but embodiments are not limited thereto. That is, step 220D shown in FIG. 13 may be performed by the image extraction unit 120 having a different configuration from the image extraction unit 120D. In addition, the image extraction unit 120D shown in FIG. 12 is described as operating in the order shown in FIG. 13, but embodiments are not limited thereto. That is, according to another embodiment, the image extraction unit 120D shown in FIG. 12 may operate in a different order from the method 220D shown in FIG. 13.

First, it is determined whether an peripheral image acquired by the image acquisition unit 110 includes a '2-2'-nd image (step 602). If the peripheral image includes the '2-2'-nd image, the '2-2'-nd image detection unit 126D detects the '2-2'-nd image from the peripheral image received from the image acquisition unit 110 via the input terminal IN1 (step 614).

Steps 602 and 614 are performed in the '2-2'-nd image detection unit 126D for the following reason. If the '2-2'-nd image is included in the peripheral image, the '2-2'-nd image detection unit 126D may detect the '2-2'-nd image. However, if the '2-2'-nd image is not included in the peripheral image, the '2-2'-nd image detection unit 126D does not detect the '2-2'-nd image.

If the peripheral image does not include the '2-2'-nd image, it is determined whether the peripheral image includes the '1-2'-nd image (step 604). If the peripheral image includes the '1-2'-nd image, the '1-2'-nd image detection unit 126C detects the '1-2'-nd image from the peripheral image received from the image acquisition unit 110 via the input terminal IN1 (step 606).

Steps 602, 604, and 606 are performed by the '1-2'-nd image detection unit 126C for the following reason. If the '1-2'-nd image is included in the peripheral image, the '1-2'-nd image detection unit 126C may detect the '1-2'-nd image. If the '1-2'-nd image is not included in the peripheral image, the '1-2'-nd image detection unit 126C does not detect the '1-2'-nd image.

Depending on the situation around the vehicle, the peripheral image may include both the '1-2'-nd image and the '2-2'-nd image. That is, an image of a part of the lower body of the moving object, for example, the '2-2'-nd image, which is the image of the feet, and an image of a part of the upper body, for example, the '1-2'-nd image, which is the image of the head may be included in the peripheral image. In the case where both the first image and the second image are contained in the peripheral image as described above, according to the 220D operation shown in FIG. 13, only the '2-2'-nd image is detected without detecting the '1-2'-nd image. However, embodiments are not limited thereto.

According to another embodiment, when both the '1-2'-nd and the '2-2'-nd images are contained in the peripheral image, only the '1-2'-nd image may be detected without detecting the '2-2'-nd image.

According to another embodiment, when both the '1-1'-st and '2-2'-nd images are contained in the peripheral image, the '1-2'-nd and '2-2'-nd images may be detected.

After step 606, the '1-2'-nd image verification unit 128C may verify the '1-2'-nd image detected by the '1-2'-nd image detection unit 126C, and output the verified result to the first video determination unit 122C (step 608).

After step 614, the '2-2'-nd image verification unit 128D may verify the '2-2'-nd image detected by the '2-2'-nd image detection unit 126D, and output the verified result to the second image determination unit 122D (step 616).

After step 608, the first image determination unit 122C determines the '1-1'-st image from the '1-2'-nd image verified by the '1-2'-nd image verification unit 128C (step 610). For example, as illustrated in FIG. 4B, if the 1-2 image is the image of the head in the upper body of the moving object, the '1-2'-nd image I12 of the head of the moving object MB may be verified, and then the first image determination unit 122C may determine that the '1-1'-st image I11 of the upper body exists at the lower end of the head. While the '1-1'-st image I11 of the upper body is illustrated as including the '1-2'-nd image I12 of the head, embodiments are not limited thereto.

After step 616, the second image determination unit 122D determines the '2-1'-st image from the '2-2'-nd image verified by the '2-2'-nd image verification unit 128D (step 618). For example, as illustrated in FIG. 3B or 5B, when the '2-2'-nd image is an image of the feet of the moving object, the '2-2'-nd images I22-1 and I22-2 of the feet may be verified, and then it may be determined that the '2-1'-st image I21 of the lower body exists at the upper end of the feet. While the '2-1'-st image I21 of the lower body is illustrated as including the '2-2'-nd images I22-1 and I22-2 of the feet, embodiments are not limited thereto.

In some cases, at least one of the '1-2'-nd image verification unit 128C or the '2-2'-nd image verification unit 128D shown in FIG. 12 and at least one of step 608 or step 616 shown in FIG. 13 may be omitted.

If the '1-2'-nd image verification unit 128C and step 608 are omitted, the first image determination unit 122C determines the '1-1'-st image from the '1-2'-nd image detected by the '1-1'-st image detection unit 126C after step 608 (step 610). If the '2-2'-nd image verification unit 128D and step 616 are omitted, the second image determination unit 122D determines the '2-1'-st image from the '2-2'-nd image detected by the '2-2' image detection unit 126D (step 618).

According to another embodiment, the first image determination unit 122C, the first image verification unit 124C, the second image determination unit 122D, and the '2-1'-st image verification unit 124D shown in FIG. 12 may be omitted, and steps 610, 612, 618, and 620 shown in FIG. 13 may be omitted. In this case, the '1-2'-nd image verified by the '1-2'-nd image verification unit 128C may be output to the moving object information determination unit 130 via the output terminal OUT12, and the '2-2'-nd image verified by the '2-2'-nd image verification unit 128D may be output to the moving object information determination unit 130 via the output terminal OUT22. Therefore, the image extraction unit 120D does not provide the '1-1'-st and '2-1'-st images but provides at least one of the '1-2'-nd or '2-2'-nd image to the moving image information determination unit 130.

After step 610, the '1-1'-st image verification unit 124C may verify the '1-1'-st image determined by the first image determination unit 122C and output the verified result to the moving object information determination unit 130 via the output terminal OUT12 (step 612). After step 618, the '2-1'-st image verification unit 124D may verify the '2-1'-st image determined by the second image determination unit 122D, and output the verified result to the moving object information determination unit 130 via the output terminal OUT22 (step 620).

In some cases, at least one of the '1-1'-st image verification unit 124C or the '2-1'-st image verification unit 124D shown in FIG. 12 may be omitted, and at least one of step 612 or step 620 shown in FIG. 13 may be omitted.

Each of the '1-1'-st image detection unit 122A, the '1-2'-nd image detection units 126A and 126C, the '2-1'-st image detection unit 122B, the '2-2'-nd image detection units 126B and 126D, the '1-1-1'-st image detection unit 122A-1, the '1-2-1'-st image detection unit 126A-1, the '1-1-2'-nd image detection unit 122A-2, the '1-2-2'-nd image detection unit 126A-2, the '2-2-1'-st image detection unit 122B-1, the '2-2-1'-st image detection unit 126B-1, the '2-1-2'-nd image detection unit 122B-2, the '2-2-2'-nd image detection unit 126B-2, the first and second common image detection units 121A and 121B and the first and second image classification units 123A and 123B described above may detect or classify a corresponding one of the '1-1'-st, '1-2'-nd, '2-1'-st and '2-2'-nd images using a various method. For example, each of the '1-1'-st, '1-2'-nd, '2-1'-st and '2-2'-nd images may be detected using a moving object detection approach, an appearance-based approach, or a contour-based approach. Here, the moving object detection approach includes, for example, background subtraction, temporal differencing, and optical flow. The appearance-based approach includes, for example, Viola-Jones, HOG (Histogram of Oriented Gradients)-SVM (Support Vector Machine), Principal Component Analysis (PCA), Linear Discriminant Analysis (LDA), Independent Component Analysis (ICA) and Non-Negative Matrix Factorization (NMF). Here, Viola-Jones includes, for example, Haarr/HOG/LBP. In addition, the contour-based approach includes, for example, active contour or chamfer matching.

Each of the '1-1'-st image verification units 124A and 124C, the '2-1'-st image verification units 124B and 124D, the '1-2'-nd image verification units 128A and 128C, the '2-2'-nd image verification units 128B and 128D, the '1-1-1'-st image verification unit 124A-1, the '1-1-2'-st image verification unit 124A-2, the '2-1-1'-st image verification unit 124B-1, the '2-1-2'-nd image verification unit 124B-2, the '1-2-1'-st image verification unit 128A-1, the '1-2-2'-nd image verification unit 128A-2, the 2-2 1 image verification unit 128B-1 and the '2-2-2'-nd image verification unit 128B-2 may verify a corresponding image using at least one of the position, size, or pattern of the moving object.

Figure 14:
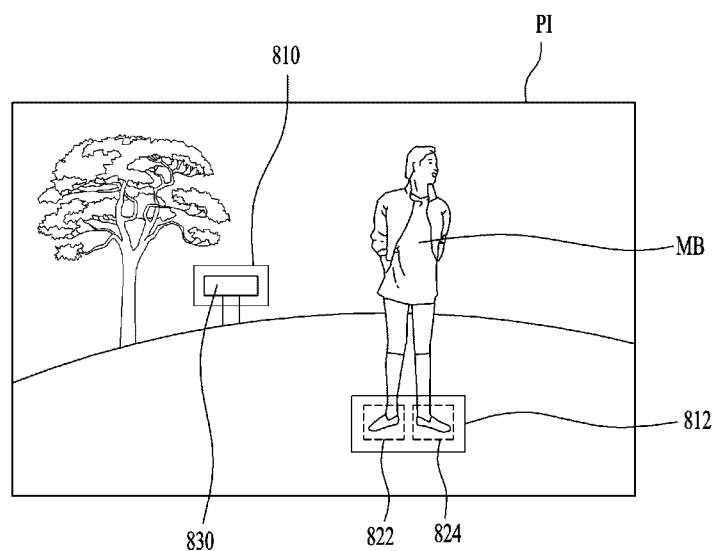
FIG. 14 exemplarily shows a peripheral image for explaining verification of a detected image.

FIG. 14 exemplarily shows a peripheral image PI for explaining verification of a detected image.

For example, referring to FIG. 14, the peripheral image PI acquired by the image acquisition unit 110 contains a moving object MB walking around the vehicle. Here, it is assumed that '2-2'-nd images 810 and 812 are detected by the '2-2'-nd image detection units 126B and 126D. The second '2-2'-nd image 812 is correctly detected as an image corresponding to the feet of the lower body of the moving object MB while the second '2-2'-nd image 810 is incorrectly detected as an image corresponding to a fire hydrant 830, but the moving object MB. Accordingly, the '2-2'-nd image verification units 128B and 128D verify the '2-2'-nd images 810 and 812, and filter out the '2-2'-nd image 810 corresponding to the fire hydrant 830. In this manner, the image verification unit serves to filter only the correct image related to the moving object in the detected image. To this end, the image verification units may use at least one of the position, size, or pattern of the moving object.

Figure 15:
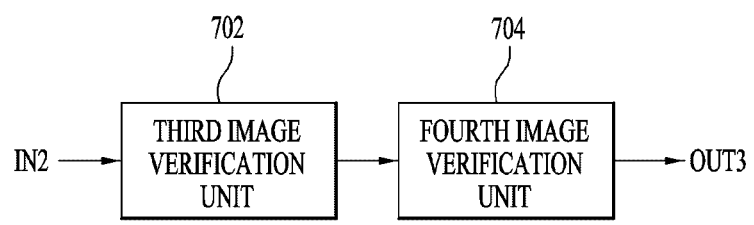
FIG. 15 is a block diagram of an embodiment of the respective image verification units shown in FIGS. 6, 8, 10, and 12.

FIG. 15 is a block diagram of an embodiment of the respective image verification units shown in FIGS. 6, 8, 10, and 12, which may include a third image verification unit 702 and a fourth image verification unit 704.

Each of the '1-1'-st image verification units 124A and 124C, the '2-1'-st image verification units 124B and 124D, the '1-2'-nd image verification units 128A and 128C and the '2-2'-nd image verification units 128B and 128D, the '1-1-1'-st image verification unit 124A-1, the '1-1-2'-nd image verification unit 124A-2, the '2-1-1'-st image verification unit 124B-1, the '2-1-2'-nd image verification unit 124B-2, the '1-2-1'-st image verification unit 128A-1, the '1-2-2'-nd image verification unit 128A-2, the '2-2-1'-st image verification unit 128B-1, and the '2-2-2'-nd image verification unit 128B-2 shown in FIGS. 6, 8, 10 and 12 may be implemented as shown in FIG. 15.

The third image verification unit 702 may receive the '1-1'-st, '1-2'-nd, '2-1'-st, or '2-2'-nd image via the input terminal IN2, and verify the '1-1'-st, '1-2'-nd, '2-1'-st, or '2-2'-nd image using the position and size of the moving object.

In addition, the fourth image verification unit 704 may receive the '1-1'-st, '1-2'-nd, '2-1'-st, or '2-2'-nd image, recognize the pattern of the moving object, and verify '1-1'-st, '1-2'-nd, '2-1'-st, or '2-2'-nd image using the recognized result. To this end, the '1-1'-st, '1-2'-nd, '2-1'-st, or '2-2'-nd image may be bypassed by the third image verification unit 702 and provided to the fourth image verification unit 704, or may be directly provided from the input terminal IN2 to the fourth image verification unit 704 as shown in FIG. 15.

To this end, the fourth image verification unit 704 may be implemented by a combination of various feature extraction methods and classifiers. For example, HOG, LBP, the Scale Invariant Feature Descriptor (SIFT), the Gabor filter, PCA, ICA, and NMF are examples of the feature extraction methods. Examples of the classifiers include SVM, decision trees, random forests, or neural networks.

Further, the image may be verified using a method other than the above-described approaches for verifying the image. This is intended to increase accuracy of verification. For example, if PCA is used to verify the detected image, the image may be verified with accuracy higher than when methods other than PCA, such as NMF, are used to verify the image.

The '1-1'-st, '1-2'-nd, '2-1'-st, or '2-2'-nd image verification unit 124A, 124B, 124C, 124D, 124A-1, 124A-2, 124B-1, 124B-2, 128A, 128B, 128C, 128D, 128A-1, 128A-2, 128B-1, or 128B-2 may include third and fourth image verification units 702 and 704 illustrated in FIG. 15. The fourth image verification unit 704 may re-verify the verified '1-1'-st, '1-2'-nd, '2-1'-st, or '2-2'-nd image verified by the third image verification unit 702.

According to another embodiment, the third image verification unit 702 may re-verify the '1-1'-st, '1-2'-nd, '2-1'-st, or '2-2'-nd image verified by the fourth image verification unit 704.

According to yet another embodiment, the image verification unit 124A, 124B, 124C, 124D, 124A-1, 124A-2, 124B-1, 124B-2, 128A, 128B, 128C, 128D, 128A-1, 128A-2, 128B-1 or 128B-2 may include only one of the third image verification unit 702 and the fourth image verification unit 704.

Figure 16:
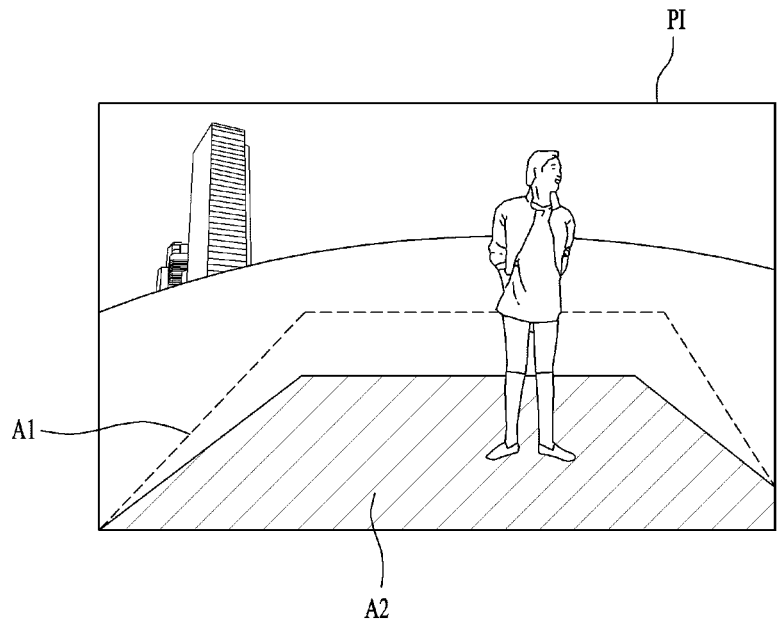
FIG. 16 shows an exemplary peripheral image for explaining a detection area and an alert area.

FIG. 16 shows an exemplary peripheral image PI for explaining a detection area A1 and an alert area A2.

In the image extraction unit 120, 120A, 120B, 120C, 120D, the image detection unit 122A, 122B, 122A-1, 122A-2, 122B-1, 122B-2, 126A, 126A-1, 126A-2, 126B, 126B-1, 126B-2, 126C, 126D may detect at least one of the first or second image from the detection area of the acquired peripheral image PI. For example, referring to FIG. 16, the detection area A1 may be an area covering points within a first distance from the vehicle. For example, the first distance may be 5 meters, but embodiments are not limited thereto. Therefore, for a moving object in the non-detection area outside the detection area A1, the first and second images may not be detected.

Referring back to FIGS. 1 and 2, after step 220, the moving object information determination unit 130 may determine (or, generate) moving object information using at least one of the first image or the second image extracted by the image extraction unit 120 (step 230). Here, the "moving object information" is information on the moving object and may include any information that may reduce or prevent accidents caused by the vehicle when recognized by the driver or the passenger of the vehicle. For example, the moving object information may include at least one of information about whether or not a moving object is present in the vicinity of the vehicle or the position of the moving object.

The moving object information determination unit 130 may use at least one of the '1-1'-st, '1-2'-nd, '2-1'-st, or '2-2'-nd image to determine the moving object information. For example, the moving object information determination unit 130 may determine the moving object information using a combination of multiple ones of the '1-1'-st, '1-2'-nd, '2-1'-st, or '2-2'-nd images.

For example, when the upper body of the moving object is hidden, the moving object information determination unit 130 may correctly determine the position of the moving object by combining the '2-1'-st image and the '2-2'-nd image. Alternatively, when the lower body of the moving object is hidden, the moving object information determination unit 130 may correctly determine the position of the moving object by combining the '1-1'-st image and the '1-2'-nd image. Alternatively, when a large part of the lower body of the moving object is hidden and a large part of the upper body of the moving object is hidden, the combination of the '1-1'-st image and the '1-2'-nd image and the combination of the '2-1'-st image and the '2-2'-nd image may be used to more correctly determine the moving object information. Therefore, even when at least a part of the upper body or the lower body of the moving object is hidden, the moving object information may be correctly determined.

According to another embodiment, the moving object information determination unit 130 may determine the moving object information using only at least one of the '1-2'-nd or '2-2'-nd image or using only at least one of the '1-1'-nd or '2-1'-nd image.

In addition, when the image extraction unit 120 extracts both the first image and the second image, the moving object information determination unit 130 may determine the moving object information using an image extracted first among the first image and the second image. However, embodiments are not limited thereto.

Alternatively, when the image extraction unit 120 extracts both the first image and the second image as described above, the moving object information determination unit 130 may determine the moving object information using only the second image. This may be intended to facilitate tracking of the position of the moving object, as will be described later, since the moving object is moved by the lower body rather than the upper body and since the upper body of the moving object is more likely to be hidden than the lower body is. As described above, when the second image of the lower body rather than the upper body of the moving object is used, the moving object information may be determined more accurately and quickly. However, embodiments are not limited thereto.

When the peripheral image includes neither the '1-1' image nor the '2-1'-st image in FIGS. 7, 9 and 11, or when the peripheral image includes neither the '1-2'-nd image nor the '2-2'-nd image in FIG. 13, the first image or the second image is not provided from the image extraction unit 120 to the moving object information determination unit 130. In this case, the moving object information determination unit 130 may determine that the moving object does not exist.

According to an embodiment, the moving object information providing device 100 for a vehicle may further include a moving object alert unit 140. After step 230, the moving object alert unit 140 may announce the moving object information to a person who needs to be warned to prevent a traffic accident, such as a driver of the vehicle or a driver of another vehicle located in the vicinity of the vehicle, in response to the result determined by the moving object information determination unit 130 (step 240). Here, the announced moving object information may be, for example, at least one of the presence or position of the moving object.

According to an embodiment, when the moving object enters the alert area, the moving object alert unit 140 may announce the moving object information. Here, the alert area may be an area of points within a second distance from the vehicle. For example, referring to FIG. 16, the alert area A2 may be an area closer to the vehicle than the detection area A1. For example, the second distance may be 3 meters. However, embodiments are not limited thereto. When the moving object is located outside the alert area A2, the moving object alert unit 140 may not announce the moving object information, but embodiments are not limited thereto.

Figure 17:
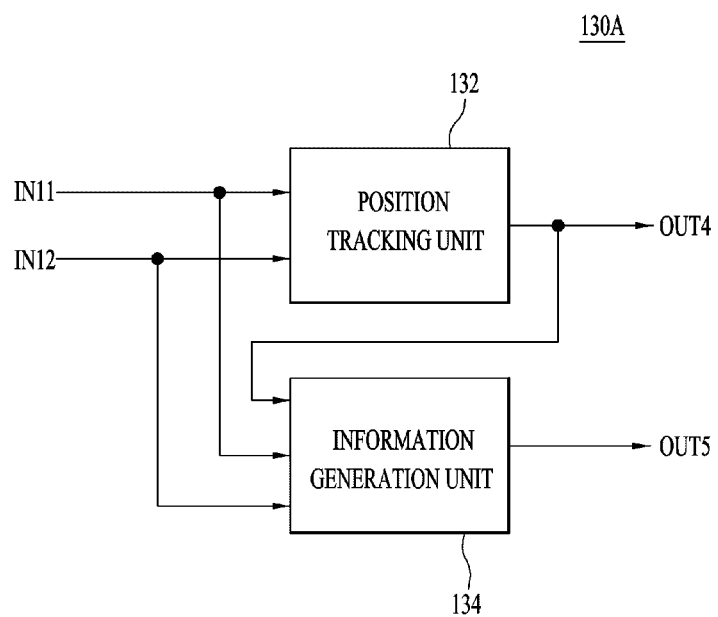
FIG. 17 is a block diagram illustrating an embodiment of the moving object information determination unit shown in FIG. 1.

FIG. 17 is a block diagram of an embodiment 130A of the moving object information determination unit 130 shown in FIG. 1, which may include a position tracking unit 132 and an information generation unit 134.

Referring to FIG. 17, the position tracking unit 132 may track the position of the moving object using at least one of the first or second image extracted by the image extraction unit 120, and output the tracked position via the output terminal OUT4. The tracked position may be output to the information generating unit 134 or to the moving object alert unit 140. The moving object alert unit 140 may announce the moving object information according to the tracked position of the moving object. For example, the position tracking unit 132 may receive the first image and the second image extracted by the image extraction unit 120 via the input terminals IN3 and IN4, respectively.

In addition, the position tracking unit 132 may determine that a moving object exists at a position where a combination of the '2-1'-st image and the '2-2'-nd image is confirmed. For example, referring to FIGS. 3B and 5B, it is determined that a moving object MB exists at a position where the combination of the '2-1'-st image I21 and the '2-2'-nd images I22-1 and I22-2 is confirmed.

Alternatively, the position tracking unit 132 may determine that a moving object exists at a position where a combination of the '1-1'-st image and the '1-2'-nd image is confirmed. For example, referring to FIG. 4B, it may be determined that a moving object MB exists at a position where the combination of the '1-1'-st image I11 and the '1-2'-nd image I12 is confirmed.

For example, when the first or second image provided from the image extraction unit 120 is a previously detected image, the path of movement of the moving object may be tracked by integrating the temporal detection results. For example, the position tracking unit 132 may track the position of the moving object by associating the continuously detected sizes of the moving object with the continuously detected positions of the moving object based on similarity of the continuously detected sizes and the continuously detected positions.

Alternatively, when the moving object is intermittently detected, the position tracking unit 132 may detect the moving object using various visual tracking methods such as using the similarity of colors, gradients or shapes of the moving object.

In addition, the position tracking unit 132 may predict and correct the result of tracking the position of the moving object by various filtering techniques such as stochastic filtering. Such filtering techniques include, for example, Kalman filtering, extended Kalman filtering, unscented Kalman filtering, or particle filter.

The information generating unit 134 may generate (or, determine) moving object information using at least one of the first image or the second image extracted by the image extraction unit 120 or the tracked position output from the position tracking unit 132, and output the generated information via an output terminal OUT5.

As a result, the moving object information providing device and method for a vehicle according to the embodiments may determine and provide information on the moving object using at least one of the '1-1'-st, '1-2'-nd, '2-1'-st, or '2-2'-nd image, thereby helping to prevent vehicles from causing traffic accidents.

Further, as shown in FIGS. 3A and 3B, when the moving object MB is standing close to the vehicle, the upper body thereof may be hidden. When the moving object is squatting as shown in FIGS. 4A and 4B, the lower body thereof may be hidden. According to the conventional method of detecting the whole body, the information on the moving object may not be correctly determined due to various postures of the moving object. In contrast, the moving object information providing device according to an embodiment divides a peripheral image into a first image of the upper body of the moving object and a second image of the lower body of the moving object, and determines the information on the moving object using the divided images. Therefore, even in a situation where the lower body or the upper body of the moving object is hidden, the information on the moving object may be correctly determined, and the influence of distortion of the fisheye lens may be reduced.

Further, in the moving object information providing method according to an embodiment, the '1-1'-st, '1-2'-nd, '2-1'-st and '2-2'-nd images are detected and verified, thereby enhancing the accuracy of the '1-1'-st, '1-2'-nd, '2-1'-st and '2-2'-nd images. Therefore, the information on the moving object may be determined more accurately.

In addition, the '2-2'-nd image of a part of the lower body of the moving object is used to determine the moving object information, it may be easy to determine whether or not the moving object is positioned in the alert area A2.

Further, the moving object information may be determined using only the '1-2'-nd image or only the '1-1'-st image, not the combination of the '1-1'-st image and the '1-2'-nd image. In addition, the information on the moving object may be determined using only the '2-1'-st image or only the '2-2'-nd image, not the combination of the '2-1'-st image and the '2-2'-nd image. Therefore, the structure of the moving object information providing device for a vehicle may be simplified, and the moving object information providing method for a vehicle may be executed quickly and easily.

In addition, the moving object information providing method and device according to an embodiment may determine the moving object information by distinguishing between the lower body and the upper body of the moving object. Accordingly, the moving object information may be accurately determined using the second image of the lower body of the moving object when the lower body of the moving object is dynamically changed without dynamic change of the upper body. Alternatively, the moving object information may be accurately determined using the first image of the upper body of the moving object when only the upper body is dynamically changed without dynamic change of the lower body. Moreover, since the moving object information is determined using the second image of the lower body of the moving object when the upper body of the moving object is hidden and using the first image of the upper body of the moving object when the lower body of the moving object is hidden, the moving object information may be accurately determined even when the upper body or the lower body of the moving object is hidden. In addition, the moving object information may be determined using only the image of the head, which is a part of the upper body, or the feet, which is a part of the lower body when most of the upper and lower bodies of the moving object are hidden. Therefore, the moving object information may be accurately determined even when most of the upper and lower bodies of the moving object are hidden.

In addition, the moving object information may be determined more accurately using both the result obtained by combining the '1-1'-st image and the '1-2'-nd image and the result obtained by combining the '2-1'-st image and the '2-2'-nd image.

As such, since moving object information is determined using at least one of the '1-1'-st, '1-2'-nd, '2-1'-st, or '2-2'-nd image, the information on the moving object may be accurately determined and announced to the driver in various situations including the standing position, the position very close to the vehicle, and squatting position of the moving object located near the vehicle and the small size of the moving object. Thereby, traffic accidents may be prevented.

A recording medium on which a program for executing the moving object information providing method 200 for a vehicle performed by the moving object information providing device 100 is recorded may have a program for implementing a function of acquiring a peripheral image of the vehicle, a function of extracting from the acquired peripheral image at least one of a first image of the upper body of the moving object Or a second image of the lower body of the moving object and a function of determining at least one of the presence/absence or position of the moving object using at least one of the extracted first or second image, and the computer may read the recording medium.

On the computer-readable recording medium, a program having the first image including at least one of a '1-1'-st image of the whole upper body of the moving object or a '1-2'-nd image of a part of the upper body of the moving object and the second including at least one of a '2-1'-st image of the whole lower body of the moving object or a '2-2'-nd image of a part of the lower body of the moving object may be recorded.

The program for implementing the function of extracting at least one of the first image or the second image, which includes a function of detecting the '1-1'-st image from the acquired peripheral image when the acquired peripheral image includes the '1-1'-st image, a function of detecting a '2-1'-st image from the acquired peripheral image when the acquired peripheral image includes the '2-1'-st image, a function of verifying the detected '1-1'-st or '2-1'-st image, a function of detecting a '1-2'-nd or '2-2'-nd image from the verified '1-1'-st or '2-1'-st image, respectively, and a function of verifying the detected '1-2'-nd or '2-2'-nd image, may be recorded on a recording medium, and the computer may read the recording medium.

In addition, the function of detecting the '1-1'-st image may include a function of detecting, when a moving object contained in the '1-1'-st image included in the acquired peripheral image faces in the first direction with respect to the vehicle, the '1-1'-st image in the first direction from the acquired peripheral image and a function of detecting, when the moving object contained in the '2-1'-st image included in the acquired peripheral image faces in the second direction different from the first direction with respect to the vehicle, the '1-1'-st image in the second direction from the acquired peripheral image.

In addition, the program for implementing the function of detecting the '2-1'-st image, which may include a function of detecting, when a moving object contained in the '2-1'-st image included in the acquired peripheral image faces in the first direction with respect to the vehicle, the '2-1'-st image in the first direction from the acquired peripheral image and a function of detecting, when the moving object contained in the '2-1'-st image included in the acquired peripheral image faces in the second direction with respect to the vehicle, the '2-1'-st image in the second direction from the acquired peripheral image, may be recorded on a recording medium and the computer may read the recording medium.

The program for implementing the function of detecting the 1-1 or '2-1'-st image may include a function of detecting the '1-1'-st image from the acquired peripheral image when the '1-1'-st image is included in the acquired peripheral image, a function of classifying the '1-1'-st image in the first direction from the detected '1-1'-st image when the moving object faces in the first direction with respect to the vehicle in the detected '1-1'-st image, and a function of classifying the '1-1'-st image in the second direction from the detected '1-1'-st image when the moving object contained in the detected '1'1'-st image faces in the second direction with respect to the vehicle. Alternatively, a program for implementing a function of detecting the '2-1'-st image from the acquired peripheral image when the '2-1'-st image is included in the acquired peripheral image, a function of classifying the '2-1'-st image in the first direction from the detected '2-1'-st image when the moving object faces in the first direction with respect to the vehicle in the detected '2-1'-st image, and a function of classifying the '2-1'-st image in the second direction from the detected '2-1'-st image when the moving object contained in the detected '2-1'-st image faces in the second direction with respect to the vehicle may be recorded, and the computer may read the recording medium.

The computer-readable recording medium may include all kinds of storage devices in which data that may be read by a computer system is stored. Examples of the computer-readable recording medium include ROM, RAM, CD-ROM, magnetic tapes, floppy disks, and optical data storage devices, and also include carrier-wave type implementation (e.g., transmission over the Internet). The computer-readable recording medium may be distributed to a computer system connected over a network, and computer-readable code may be stored and executed thereon in a distributed manner. Functional programs, codes, and code segments for implementing the method of opening the vehicle trunk may be easily inferred by programmers in the art to which the embodiments pertain.

While the present disclosure has been particularly shown and described with reference to exemplary embodiments thereof, it is to be understood that the disclosure is not limited to the disclosed embodiments. It will be understood by those skilled in the art that various modifications and applications are possible without departing from the essential features of the embodiments. For example, each component specifically shown in the embodiments may be modified and implemented. It is to be understood that all changes and modifications that come within the meaning and range of equivalency of the claims are therefore intended to be embraced therein.

MODE FOR INVENTION

The mode for carrying out the disclosure has been fully described in "Best Mode".

INDUSTRIAL APPLICABILITY

A moving object information providing device and method for a vehicle and a recording medium on which a program for executing the method is recorded according to an embodiment may be applied to vehicles.

The invention claimed is:

1. A moving object information providing device for a vehicle, comprising:
a camera configured to acquire a peripheral image of the vehicle;
a processor configured to:
extract at least one of a first image of an upper body of at least one moving object or a second image of a lower body of the moving object from the peripheral image of the vehicle; and
determine as a moving object information at least one of presence/absence of the moving object around the vehicle or a position of the moving object using at least one of the extracted first image or second image, wherein the processor extracts, as the first image, at least one of a '1-1'-st image of an entirety of the upper body of the moving object; or a '1-2'-nd image of a part of the upper body of the moving object, and
extract, as the second image, at least one of a '2-1'-st image of an entirety of the lower body of the moving object; or a '2-2'-nd image of a part of the lower body of the moving object, and
wherein the processor determines the moving object information using only the second image without using the first image, when the processor extracts the first and second images.

2. The device according to claim 1, wherein the processor is further configured to:
detect the '1-1'-st image from the acquired peripheral image; and
detect the '2-1'-st image from the acquired peripheral image.

3. The device according to claim 2, wherein the processor is further configured to:
verify the '1-1'-st image detected by the '1-1'-st image detection unit; or
verify the '2-1'-st image detected by the '2-1'-st image detection unit.

4. The device according to claim 3, wherein the processor is further configured to:
detect the '1-2'-nd image from the '1-1'-st image; and
detect the '2-2'-nd image from the '2-1'-st image.

5. The device according to claim 4, wherein the processor is further configured to:
verify the '1-2'-nd image; or
verify the '2-2'-nd image.

6. The device according to claim 5, wherein the processor is further configured to:
detect the '1-1'-st image in a first direction in which the moving object faces the vehicle from the acquired peripheral image;
detect the '1-1'-st image in a second direction different from the first direction from the acquired peripheral image;
detect the '2-1'-st image in the first direction from the acquired peripheral image; and
detect the '2-1'-st image in the second direction from the acquired peripheral image.

7. The device according to claim 5, wherein the processor is further configured to:
detect the '1-1'-st image from the acquired peripheral image;
classify the '1-1'-st image according to a direction in which the moving object faces with respect to the vehicle from the '1-1'-st image;
detect the '2-1'-st image from the acquired peripheral image; and
classify the '2-1'-st image according to a direction in which the moving object faces with respect to the vehicle from the '2-1'-st image.

8. The device according to claim 6, wherein the processor is further configured to:
verify the '1-1'-st image in the first direction; or
verify the '1-1'-st image in the second direction, and
wherein the processor is further configured to:
verify the '2-1'-st image in the first direction; or
verify the '2-1'-st image in the second direction.

9. The device according to claim 8, wherein the processor is further configured to:
  detect the '1-2'-nd image in the first direction from the '1-1'-st image;
  detect the '1-2'-nd image in the second direction from the '1-2'-nd image detected by the processor;
  detect '2-2'-nd image in the first direction from the '2-1'-st image detected by the processor; and
  detect the '2-2'-nd image in the second direction from the '2-1'-st image detected by the processor.

10. The device according to claim 9, wherein the processor is further configured to:
  verify the '1-2'-nd image; or
  verify the '1-2'-nd image, and
  wherein the processor is further configured to:
  verify the '2-2'-nd image; or
  verify the '2-2'-nd image.

11. The device according to claim 1, wherein the processor is further configured to:
  detect the '1-2'-nd image from the acquired peripheral image; and
  detect the '2-2'-nd image from the acquired peripheral image.

12. The device according to claim 11, wherein the processor is further configured to:
  verify the '1-2'-nd image; or
  verify the '2-2'-nd image.

13. The device according to claim 12, wherein the processor is further configured to:
  determine the '1-1'-st image from the '1-2'-nd image; and
  determine the '2-1'-st image from the '2-2'-nd image.

14. The device according to claim 13, wherein the processor is further configured to:
  verify the '1-1'-st image determined by the first image determination unit; and
  verify the '2-1'-st image.

15. A method for providing moving object information for a vehicle, the method comprising:
  (a) acquiring a peripheral image of the vehicle;
  (b) extracting at least one of a first image of an upper body of at least one moving object or a second image of a lower body of the moving object from the acquired peripheral image; and
  (c) determining as a moving object information at least one of presence/absence of the moving object or a position of the moving object using at least one of the extracted first image or second image,
  wherein the first image comprises at least one of:
  a '1-1'-st image of an entirety of the upper body of the moving object; or
  a '1-2'-nd image of a part of the upper body of the moving object,
  wherein the second image comprises at least one of:
  a '2-1'-st image of an entirety of the lower body of the moving object; or
  a '2-2'-nd image of a part of the lower body of the moving object, and
  wherein the moving object information is determined using only the second image without using the first image in step (c), when the first and second images are extracted in step (b).

16. The method according to claim 15, wherein the step (b) comprises:
  detecting the '1-1'-st image from the acquired peripheral image when the acquired peripheral image comprises the '1-1'-st image;
  detecting the '2-1'-st image from the acquired peripheral image when the acquired peripheral image comprises the '2-1'-st image;
  verifying the detected '1-1'-st or '2-1'-st image;
  detecting the '1-2'-nd or '2-2'-nd image from the verified or detected '1-1'-st or '2-1'-st image, respectively; and
  verifying the detected '1-2'-nd or '2-2'-nd image.

17. The method according to claim 16, wherein the detecting of the '1-1'-st image comprises:
  detecting the '1-1'-st image of a first direction in which the moving object faces the vehicle from the acquired peripheral image when the moving object contained in the '1-1'-st image included in the acquired peripheral image faces in the first direction with respect to the vehicle; and
  detecting the '1-1'-st image of a second direction different from the first direction from the acquired peripheral image when the moving object contained in the '2-1'-st image included in the acquired peripheral image faces in the second direction with respect to the vehicle,
  wherein the detecting of the '2-1'-st image comprises:
  detecting the '2-1'-st image of the first direction from the acquired peripheral image when the moving object contained in the '2-1'-st image included in the acquired peripheral image faces in the first direction with respect to the vehicle; and
  detecting the '2-1'-st image of the second direction from the acquired peripheral image when the moving object contained in the '2-1'-st image included in the acquired peripheral image faces in the second direction with respect to the vehicle.

18. The method according to claim 16, wherein the detecting of the '1-1'-st or '2-1'-st image comprises:
  detecting the '1-1'-st image in the acquired peripheral image when the '1-1'-st image is included from the acquired peripheral image;
  classifying the '1-1'-st image of a first direction from the detected '1-1'-st image when the moving object contained in the detected '1-1'-st image faces in the first direction with respect to the vehicle;
  classifying the '1-1'-st image of a second direction different from the first direction from the detected '1-1'-st image when the moving object contained in the detected '1-1'-st image faces in the second direction with respect to the vehicle;
  detecting the '2-1'-st image from the acquired peripheral image when the '2-1'-st image is included in the acquired peripheral image;
  classifying the '2-1'-st image of the first direction from the detected '2-1'-st image when the moving object contained in the detected '2-1'-st image faces in the first direction with respect to the vehicle; and
  classifying the '1-1'-st image of the second direction different from the first direction from the detected '2-1'-st image when the moving object contained in the detected '2-1'-st image faces in the second direction with respect to the vehicle.

19. The method according to claim 15, wherein the step (b) comprises:
  detecting the '1-2'-nd image from the acquired peripheral image when the acquired peripheral image comprises the '1-2'-nd image;
  detecting the '2-2'-nd image from the acquired peripheral image when the acquired peripheral image comprises the '2-2'-nd image;
  verifying the detected '1-2'-nd or '2-2'-nd image;

determining the '1-1'-st or '2-1'-st image from the verified '1-2'-nd or '2-2'-nd image, respectively; and verifying the determined '1-1'-st or '2-1'-st image.

20. A non-transitory computer-readable recording medium on which a program for executing a moving object information providing method for a vehicle performed by a moving object information providing device for the vehicle is recorded, wherein the program is configured to implement:
- (a) a function of acquiring a peripheral image of the vehicle;
- (b) a function of extracting at least one of a first image of an upper body of a moving object or a second image of a lower body of the moving object from the acquired peripheral image; and
- (c) a function of determining as a moving object information at least one of presence of the moving object or a position of the moving object, using at least one of the extracted first or second image, and wherein the moving object information is determined using only the second image without using the first image, when the first and second images are extracted in the function (b).

* * * * *